United States Patent
Hironishi et al.

(10) Patent No.: US 9,054,814 B2
(45) Date of Patent: Jun. 9, 2015

(54) FRONT END DEVICE AND SUPERPOSING SIGNAL DETECTING DEVICE

(71) Applicant: FUJITSU LIMITED, Kawasaki-shi, Kanagawa (JP)

(72) Inventors: Kazuo Hironishi, Yokohama (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 13/756,934

(22) Filed: Feb. 1, 2013

(65) Prior Publication Data

US 2013/0243430 A1   Sep. 19, 2013

(30) Foreign Application Priority Data

Mar. 16, 2012  (JP) .................. 2012-061225

(51) Int. Cl.
*H04J 14/02* (2006.01)
*H04B 10/60* (2013.01)
*H04B 10/077* (2013.01)
*H04Q 11/00* (2006.01)

(52) U.S. Cl.
CPC ........ *H04B 10/60* (2013.01); *H04Q 2011/0026* (2013.01); *H04Q 2011/0024* (2013.01); *H04B 10/0775* (2013.01); *H04J 14/0258* (2013.01)

(58) Field of Classification Search
CPC .............. H04Q 2011/0009; H04Q 2011/0024; H04Q 2011/0026
USPC ......................... 398/45, 48, 50, 79, 82, 85–88
See application file for complete search history.

(56) References Cited

U.S. PATENT DOCUMENTS

| | | | |
|---|---|---|---|
| 5,050,954 A | 9/1991 | Gardner et al. | |
| 5,825,792 A | 10/1998 | Villeneuve et al. | |
| 6,289,028 B1* | 9/2001 | Munks et al. | 372/20 |
| 6,526,079 B1* | 2/2003 | Watterson et al. | 372/32 |
| 7,440,648 B2* | 10/2008 | Oikawa et al. | 385/16 |
| 7,907,648 B2* | 3/2011 | Matsui et al. | 372/26 |
| 8,036,534 B2* | 10/2011 | Matsumoto | 398/95 |
| 8,351,473 B1* | 1/2013 | Darcie et al. | 372/20 |
| 8,395,765 B2* | 3/2013 | Mochizuki et al. | 356/218 |
| 2002/0041735 A1 | 4/2002 | Cai et al. | |
| 2003/0133651 A1* | 7/2003 | Hakimi et al. | 385/27 |
| 2005/0152702 A1* | 7/2005 | Mahgerefteh et al. | 398/159 |

FOREIGN PATENT DOCUMENTS

| | | |
|---|---|---|
| JP | 4-212111 | 8/1992 |
| JP | 2003-195097 | 7/2003 |
| JP | 3979703 | 7/2007 |

* cited by examiner

*Primary Examiner* — Dalzid Singh
(74) *Attorney, Agent, or Firm* — Staas & Halsey LLP

(57) ABSTRACT

A front end device includes: an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle; an optical structure configured to guide the WDM optical signal to the optical filter so that the WDM optical signal enters the optical filter at a plurality of different angles; and an optical detector configured to convert an optical signal output from the optical filter to an electrical signal.

15 Claims, 26 Drawing Sheets

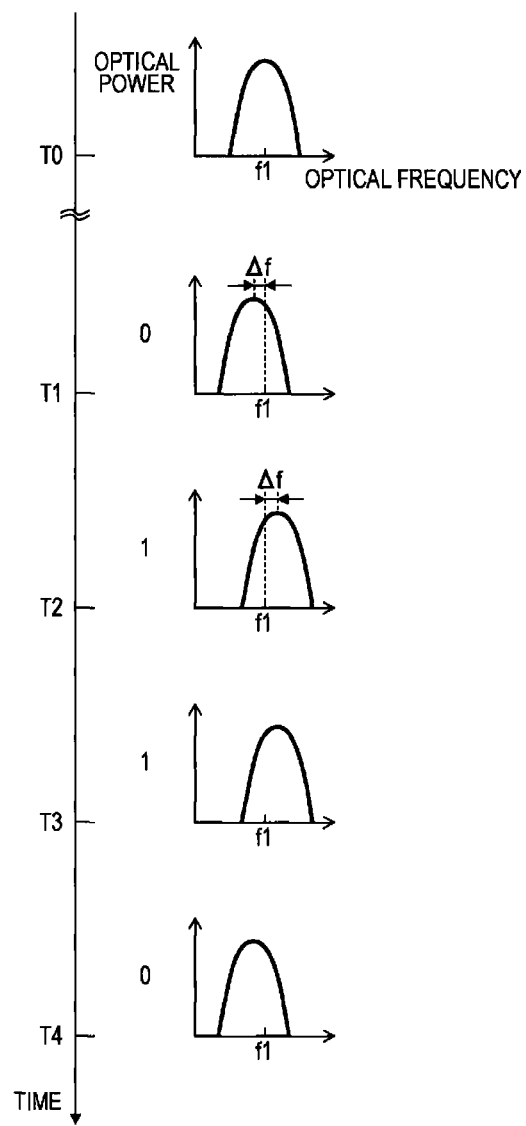

FRONT END DEVICE AND SUPERPOSING SIGNAL DETECTING DEVICE

CROSS-REFERENCE TO RELATED APPLICATION

This application is based upon and claims the benefit of priority of the prior Japanese Patent Application No. 2012-061225, filed on Mar. 16, 2012, the entire contents of which are incorporated herein by reference.

FIELD

The embodiments discussed herein are related to a front end device that receives a WDM optical signal and a superposed signal detecting device.

BACKGROUND

A photonic network including either one or both of reconfigurable optical add/drop multiplexer (ROADM) and a wavelength cross connect has been suggested and developed. A reconfigurable optical add/drop multiplexer can split an optical signal having a desired wavelength from a WDM optical signal that includes a plurality of optical signals and guide the optical signal to a client, and can insert a client signal having any wavelength to the WDM optical signal. The wavelength cross connect (WXC: wavelength cross connect or PXC: photonic cross connect) can control a route of an optical signal for each wavelength without conversion to an electrical signal.

In the photonic network as described above, a plurality of optical paths (here, wavelength paths) using the same wavelength may be set. For this reason, for reliably constructing and operating the network, for example, a scheme of superposing a supervisory signal including information for identifying an optical path on an optical signal for transmission has been suggested. In this case, an optical node device (here, such as a reconfigurable optical add/drop multiplexer or a wavelength cross connect) on the photonic network includes a function of detecting the supervisory signal superposed on the optical signal. With this, in the optical node device, each optical path can be reliably identified, thereby making it possible to either or both of monitor and detect a failure such that an optical fiber is connected to an erroneous port.

The supervisory signal described above is superposed on the optical signal by frequency shift keying (FSK). Here, in the WDM transmission system, the supervisory signal can be superposed on an optical signal of each channel of the WDM optical signal.

FIG. 1 is a diagram for describing a method of detecting a supervisory signal superposed on an optical signal of each channel. In this example, channels of a WDM optical signal are arranged at predetermined interval. In the example depicted in FIG. 1, channels CH1, CH2, CH3, ... are arranged at 50 GHz intervals.

An optical receiver has an optical filter letting part of a band of each channel pass through. In FIG. 1, the optical filter has passbands F1 to F4. The passband F1 lets part of the band of the channel CH1 pass through. Similarly, the passbands F2 to F4 let part of the bands of the channels CH2 to CH4, respectively, pass through. An output from this optical filter is converted by using an optical detector to an electrical signal, the supervisory signal superposed on the optical signal of each channel.

As such, by extracting part of the band of each channel by using an optical filter, the supervisory signal superposed on each optical signal is detected. Thus, if the channels of the WDM optical signal are arranged at predetermined intervals, by using an optical filter having periodic transmission characteristics with respect to the wavelength, the supervisory signals superposed on the plurality of optical signals can be simultaneously detected. In the example depicted in FIG. 1, an optical filter with transmission characteristics being changed at 50 GHz intervals is used.

Note that an optical monitor is suggested as related art (for example, Japanese Laid-open Patent Publication No. 2003-195097) in which the characteristics of a blazed Bragg grating are used to redirect part of an optical signal to a detection device. Still another related art is described in Japanese Laid-open Patent Publication No. 4-212111.

In a WDM transmission system in recent years, channels having different bit rates may be present in a mixed manner. Here, the bandwidth of the optical signal depends on the bit rate. That is, an optical signal with a high bit rate has a wide bandwidth, and an optical signal with a low bit rate has a narrow bandwidth.

FIG. 2A and FIG. 2B are diagrams for describing optical signals of different bit rates and their corresponding passbands. Note that the bit rate of the optical signal depicted in FIG. 2A is lower than the bit rate of the optical signal depicted in FIG. 2B. Therefore, the bandwidth of the optical signal depicted in FIG. 2A is narrower than the bandwidth of the optical signal depicted in FIG. 2B.

Here, to detect the supervisory signal superposed on the optical signal by frequency shift keying with high sensitivity, the passbands of the optical filter are preferably arranged in a region where a change in the spectrum of the corresponding optical signal is sharp. For this reason, if the bandwidth of the optical signal is narrow, as depicted in FIG. 2A, an offset frequency ΔF of the passband (a difference between a center frequency fc of the optical signal and a center frequency of a passband) with respect to the optical signal is decreased. On the other hand, if the bandwidth of the optical signal is wide, as depicted in FIG. 2B, the offset frequency ΔF of the passband with respect to the optical signal is increased. Thus, in the WDM transmission system where channels of different bit rates are present in a mixed manner, even if optical signals are arranged at predetermined intervals, the supervisory signal may not be detected with high sensitivity by using an optical filter having periodic passbands.

In an example depicted in FIG. 3, optical signals CH1, CH2, and CH4 have a bit rate of 100 Gbits/s, and an optical signal CH3 has a bit rate of 10 Gbits/s. Also, passbands F1 to F4 of an optical filter let part of the optical signals CH1 to CH4, respectively, pass through. Furthermore, the optical signals CH1 to CH4 are arranged at 50 GHz intervals. In this case, an interval between the passbands F1 and F2 is 50 GHz. However, an interval between the passbands F2 and F3 is narrower than 50 GHz. On the other hand, an interval between the passbands F3 and F4 is wider than 50 GHz. As such, when different bit rates are present in a mixed manner, to detect the supervisory signal superposed on each optical signal with high sensitivity, settings of the passbands of the optical filter are complicated.

SUMMARY

Note that the problem described above can occur not only when optical signals of different bit rates are present in a mixed manner in the WDM transmission system but also when, for example, optical signals of different modulation schemes are present in a mixed manner in the WDM transmission system.

According to an aspect of the embodiments, a front end device includes: an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle; an optical structure configured to guide the WDM optical signal to the optical filter so that the WDM optical signal enters the optical filter at a plurality of different angles; and an optical detector configured to convert an optical signal output from the optical filter to an electrical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram for describing frequency shift keying superposing;

DESCRIPTION OF EMBODIMENTS

A front end device (a front end circuit) of embodiments discussed herein is used in a WDM transmission system. That is, the front end device is provided to a device transmitting a WDM optical signal (a node device, a reconfigurable optical add/drop multiplexer (ROADM), cross connects (WXC: wavelength cross connect and PXC: photonic cross connect), and others), and receives a WDM optical signal. A WDM optical signal is assumed herein to include a plurality of optical signals each having a supervisory signal superposed thereon by frequency shift keying.

Figure 1:
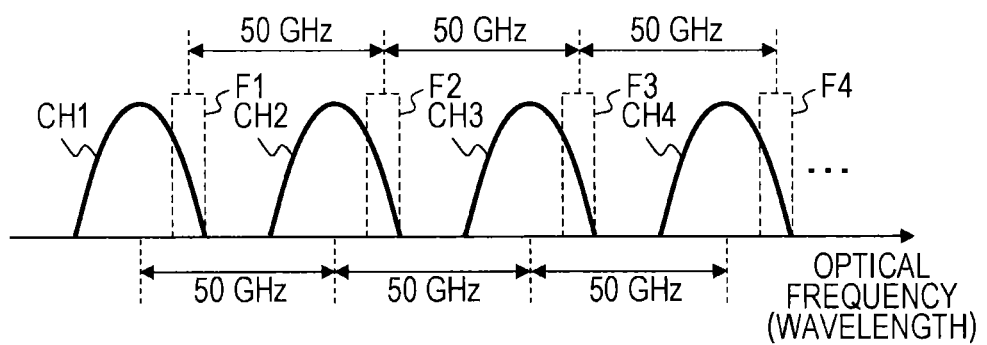
FIG. 1 is a diagram for describing a method of detecting a supervisory signal superposed on an optical signal of each channel.
Figure 2A:
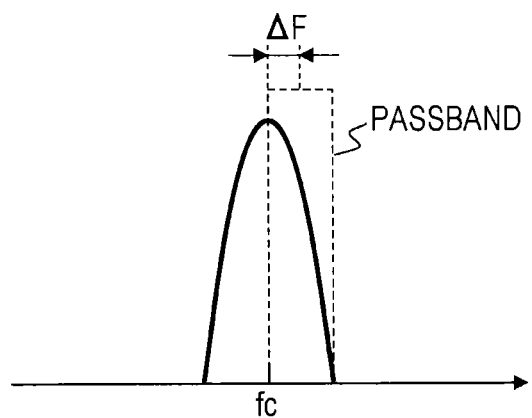
FIG. 2A and FIG. 2B are diagrams for describing optical signals of different bit rates and their corresponding passbands.
Figure 2B:
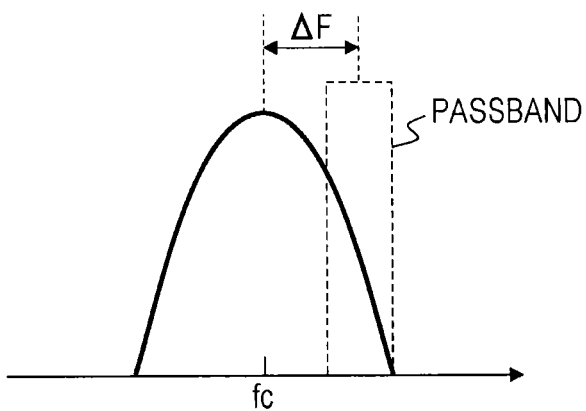
Figure 3:
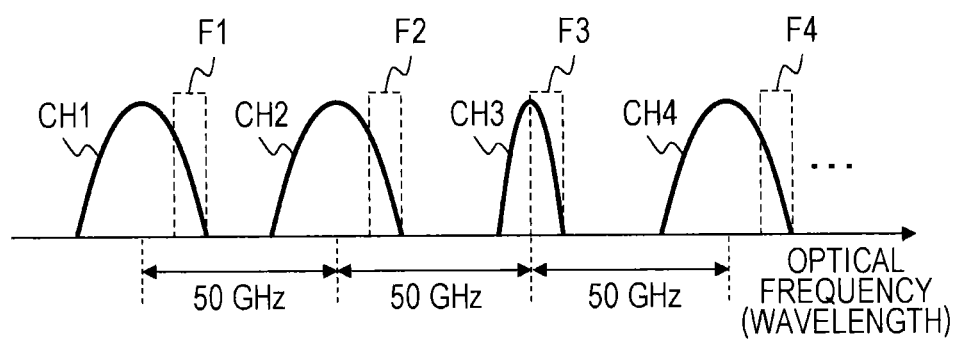
FIG. 3 is a diagram for describing a problem of related art.
Figure 4:
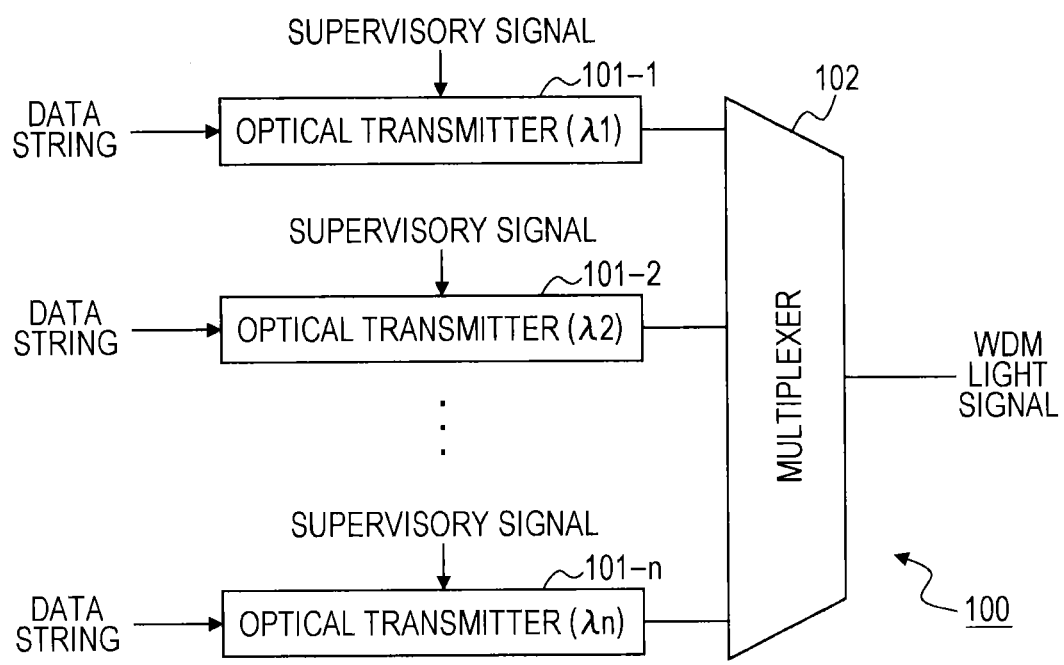
FIG. 4 is a diagram of the structure of a transmitter for transmitting a WDM optical signal.

FIG. 4 is a diagram of the structure of a transmitter for transmitting a WDM optical signal. A transmitter 100 depicted in FIG. 4 includes optical transmitters 101-1 to 101-n and a multiplexer 102.

Each of the optical transmitters 101-1 to 101-n generates an optical signal by modulating carrier light with an input data stream. Here, wavelengths k1 to λn of carrier light for use by the optical transmitters 101-1 to 101-n (that is, optical frequency) are different from each other. Also, the optical transmitters 101-1 to 101-n transmitting optical signals are provided with the corresponding supervisory signals 1 to n, respectively. These supervisory signals are not particularly restrictive, each representing a path ID for identifying a wavelength path. The path ID is assigned by, for example, a network management system that manages a WDM transmission system.

The supervisory signals are, for example, codes each having a predetermined length. In this case, codes for identifying wavelength paths are orthogonal to each other. Also, the supervisory signals may be tone signals having different frequencies. The tone signals are not particularly restrictive, and are sine signals, for example. Note that the rate of each supervisory signal (such as the bit rate of the code and the frequency of the tone signal) is sufficiently slow compared with the rate of a data stream.

The optical transmitters 101-1 to 101-n each superposes a supervisory signal on an optical signal by frequency shift keying. That is, the optical transmitters 101-1 to 101-n each outputs an optical signal having a supervisory signal superposed thereon by frequency shift keying. Then, a multiplexer 102 multiplexes optical signals output from the optical transmitters 101-1 to 101-n to generate a WDM optical signal. With the structure of the transmitter described above, a WDM optical signal including a plurality of optical signals each having a supervisory signal superposed thereon by frequency shift keying is generated. Note that the supervisory signal is an example of a superposed signal to be superposed on an optical signal.

Schemes of modulating main signal data streams by the optical transmitters 101-1 to 101-n may not be identical to each other. For example, the optical transmitter 101-1 may transmit a QPSK modulated optical signal and the optical transmitter 101-2 may transmit a 16-QAM modulated optical signal. Also, symbol rates or bit rates of optical signals output from the optical transmitters 101-1 to 101-n may not be equal to each other.

FIG. 5 is a diagram for describing frequency shift keying superposing. FIG. 5 depicts time-resolved output spectrums of an optical transmitter at times T0 and T1 to T4. A spread of an optical spectrum at each time represents a spectrum spread occurring in accordance with modulation with a main signal data stream.

The optical signal output from each transmitter has a supervisory signal indicating a path ID superposed thereon by frequency shift keying. In the example depicted in FIG. 5, the path ID is a digital code, and the path ID code superposed on the optical signal at the times T1 to T4 is "0110", The center frequency of carrier light for use by the optical transmitter is assumed to be f1.

Note that FIG. 5 is a schematic diagram for description, and a frequency shift Δf is depicted as being larger than an actual one, compared with the spectrum width of the optical signal. In particular, when data is superposed on a main signal by a modulation scheme including phase modulation such as QPSK, the actual frequency shift Δf is smaller than the spectrum of the optical signal.

At the time T0, no path ID code is superposed on the optical signal. In this case, the optical transmitter does not shift the frequency of the optical signal. Therefore, the center of the spectrum of the optical signal output at the time T0 is f1.

At the time T1, "0" is superposed on the optical signal. In this case, the optical transmitter shifts the frequency of the optical signal by −Δf in the present embodiment. Therefore, the center of the spectrum of the optical signal output at the time T1 is f1−Δf.

At the time T2, "1" is superposed on the optical signal. In this case, the optical transmitter shifts the frequency of the optical signal by +Δf. Therefore, the center of the spectrum of the optical signal output at the time T2 is f1+Δf. Similarly, the center of the spectrum of the optical signal output at the time T3 is f1+Δf, and the center of the spectrum of the optical signal output at the time T4 is f1−Δf.

The frequency shift Δf is sufficiently small compared with the frequency of carrier light. Also, Δf is determined so as not to interfere with an adjacent channel of a WDM transmission system. For example, in a WDM transmission system in which wavelength channels are arranged on a 50 GHz/100 GHz frequency grid defined by ITU-T, Δf is not particularly restrictive, but is assumed to be on the order of 1 MHz to 1 GHz. However, if Δf is too small, detection sensitivity of the supervisory signal is low in a receiver. Therefore, Δf is preferably determined in consideration of interference with an adjacent channel and detection sensitivity.

In the example depicted in FIG. 5, frequency shifts when supervisory signals indicate "0" and "1" are "−Δf" and "+Δf", respectively, but the present disclosure is not restricted to this mode. For example, frequency shifts when supervisory signals indicate "0" and "1" may be "+Δf" and "−Δf", respectively. Furthermore, the frequency shift may be zero when the supervisory signal indicates "0 (or 1)", and the optical frequency may be shifted when the supervisory signal indicates "1 (or 0)". Still further, for quaternary frequency phase shift keying, "−Δf", "−0.5Δf", "+0.5Δf", and "+Δf" may be assigned to binary-bit supervisory signals of "00", "01", "10", and "11", respectively, as frequency shifts. Still further, multivalued frequency phase shift keying other than binary or quaternary ones may be used to superpose a supervisory signal on an optical signal.

Note that while the supervisory signal is a digital signal in the embodiment depicted in FIG. 5, the method of shifting the optical frequency is substantially the same when the supervisory signal is an analog signal. However, when the supervisory signal is an analog signal, the amount of frequency shift changes not discretely but successively.

Figure 6A:
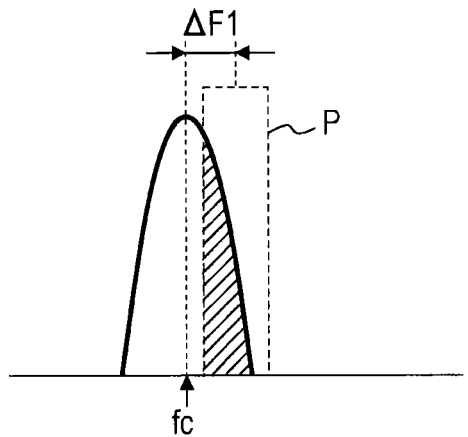
FIG. 6A to FIG. 6C are diagrams for describing a method of detecting a superposed signal superposed on an optical signal.
Figure 6B:
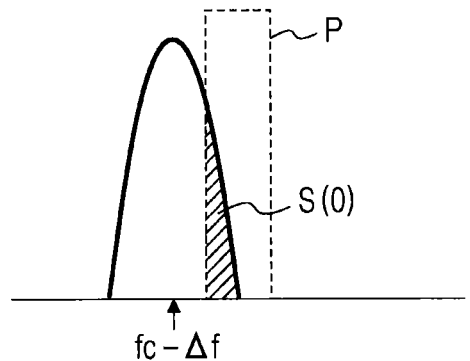
Figure 6C:
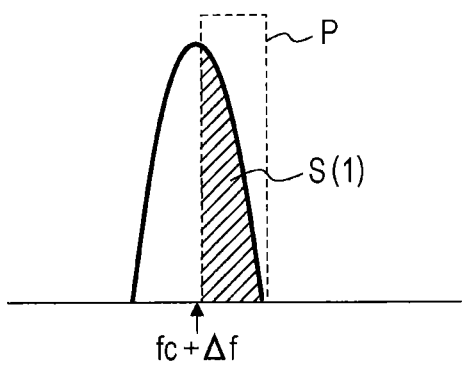

FIG. 6A to FIG. 6C are diagrams for describing a method of detecting a signal (in the example described above, a supervisory signal) superposed on an optical signal. Here, FIG. 6A to FIG. 6C each depict a spectrum of one optical signal included in the WDM optical signal and a passband provided correspondingly to that optical signal. A passband P is provided by an optical filter. Also, fc represents a center frequency of the optical signal when a supervisory signal is not superposed.

As depicted in FIG. 6A, the passband P is arranged so as to extract part of the spectrum of the corresponding optical signal. In this example, the passband P is set near the frequency fc. That is, in this example, an offset frequency ΔF1 is small. Note that the center frequency of the passband P is substantially not variable in FIG. 6A to FIG. 6C.

FIG. 6B depicts the state in which "0" is superposed on the optical signal. In this case, the center frequency of the optical signal is fc−Δf. Thus, when light passing through the optical filter is guided to an optical detector, a current corresponding to the area of a hatched region S(0) is generated.

FIG. 6C depicts the state in which "1" is superposed on the optical signal. In this case, the center frequency of the optical signal is fc+Δf. Thus, when light passing through the optical filter is guided to an optical detector, a current corresponding to the area of a hatched region S(1) is generated.

As such, the current generated by the optical detector is changed according to the value of the signal superposed on the optical signal. In the example depicted in FIG. 6A to FIG. 6C, the current is small when "0" is superposed on the optical signal, and the current is large when "1" is superposed on the optical signal. Thus, the signal (zero or 1) superposed on the optical signal can be judged based on the current generated by the optical detector. Alternatively, the signal (zero or 1) superposed on the optical signal can be judged by converting the current generated by the optical detector to a voltage and comparing the voltage with a predetermined threshold.

Meanwhile, as the bit rate of an optical signal increases, the bandwidth (or spectrum width) of that optical signal is widened. For this reason, when bit rates of the optical signals are different, the arrangement of the passband of the optical filter is preferably changed.

Figure 7A:
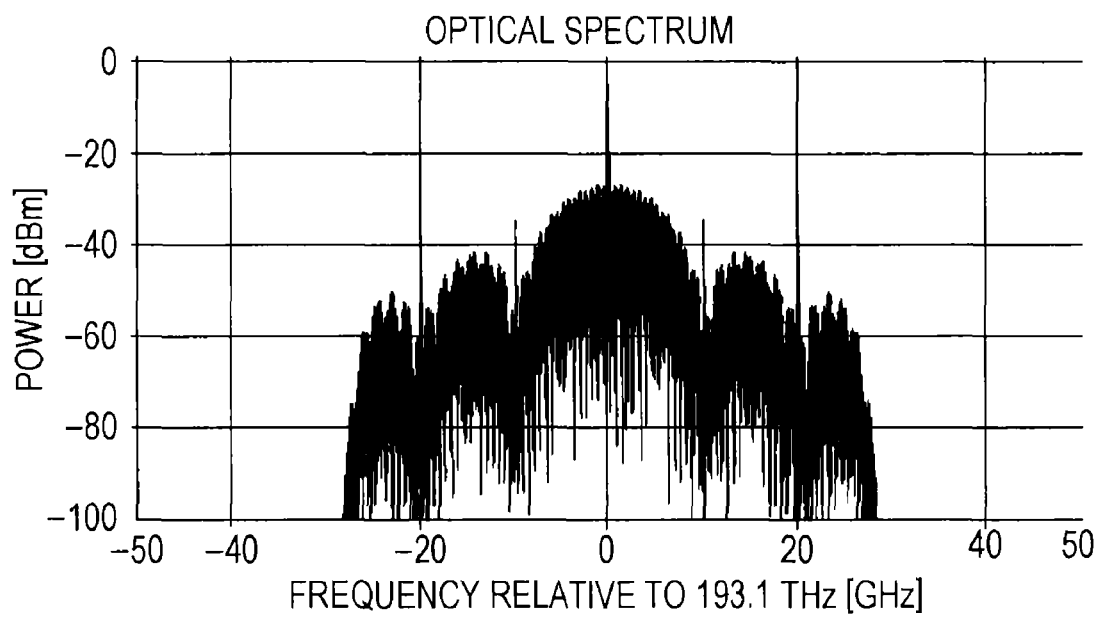
FIG. 7A depicts a spectrum of an NRZ on-off keying signal of 10 Gbits/s.
Figure 7B:
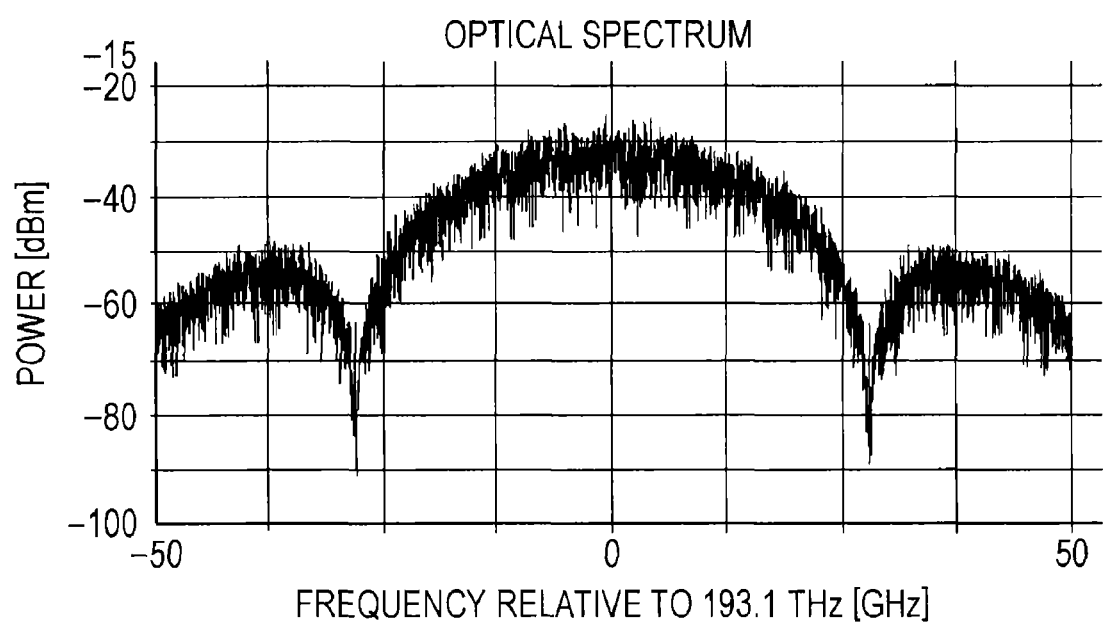
FIG. 7B depicts a spectrum of an optical polarization division multiplexing QPSK signal of 112 Gbits/s.

FIG. 7A depicts a spectrum of an NRZ on-off keying signal of 10 Gbits/s. FIG. 7B depicts a spectrum of an optical polarization division multiplexing QPSK signal of 112 Gbits/s. As such, the shape of the spectrum of the optical signal depends on the modulation scheme. Therefore, to increase detection sensitivity of the signal superposed on the optical signal, it is preferable to appropriately set the arrangement of the passband P according to the modulation scheme of the optical signal.

As such, to increase detection sensitivity of the signal superposed on the optical signal, it is preferable to appropriately set the offset frequency ΔF of the passband P according to the bit rate of the corresponding optical signal. Furthermore, it is preferable to set the offset frequency ΔF of the passband P according to not only the bit rate of the corresponding optical signal but also the modulation scheme of the corresponding optical signal.

Figure 8:
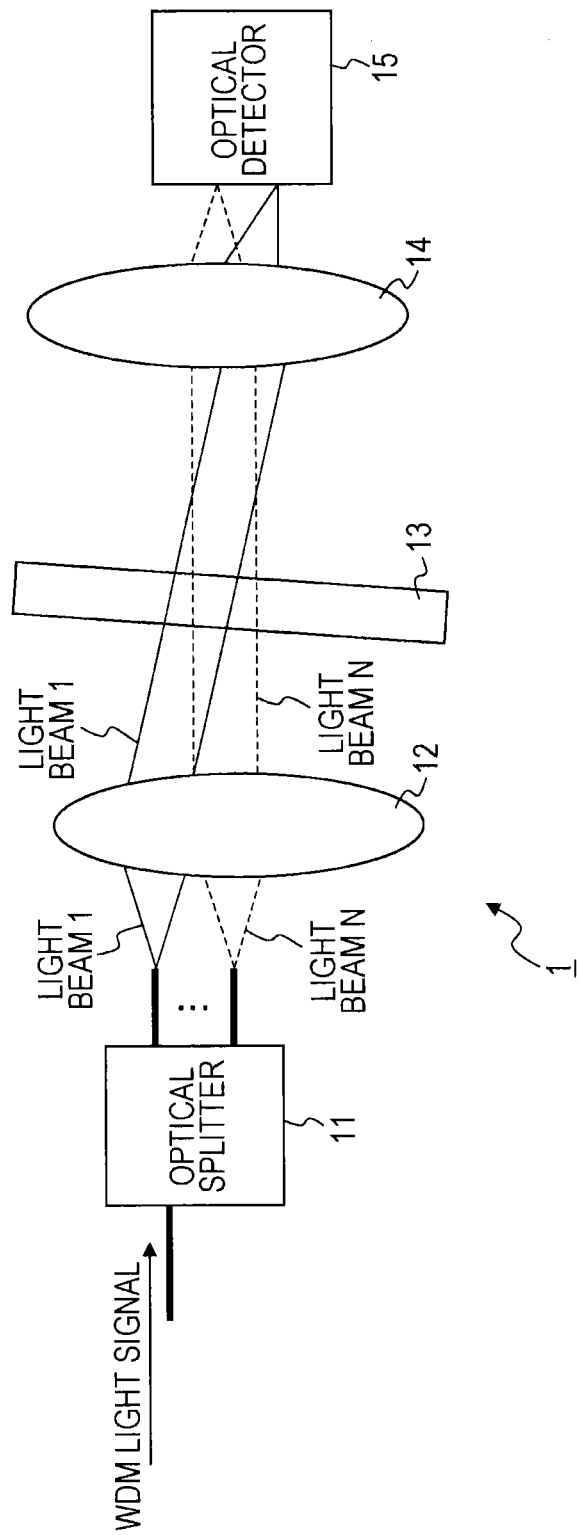
FIG. 8 is a diagram of the structure of a front end device of a first embodiment.

FIG. 8 is a diagram of the structure of a front end device of a first embodiment. A front end device 1 of the first embodiment includes an optical splitter 11, a lens 12, an etalon filter 13, a lens 14, and an optical detector 15. To the front end device 1, a WDM optical signal is input. As described with reference to FIG. 4, the WDM optical signal includes a plurality of optical signals each having a supervisory signal superposed thereon by frequency shift keying.

The optical splitter 11 has a plurality of output ports, splitting the input WDM optical signal for output to each output port. That is, light beams 1 to N are output from the optical splitter 11. N represents the number of output ports of the optical splitter, and is an integer equal to or larger than 2, Each of the light beams 1 to N is a WDM optical signal obtained by splitting the input WDM optical signal. Also, although the power of the light beams 1 to N is not particularly restrictive, the light beams 1 to N preferably have the same power or approximately the same power.

In FIG. 8, only two light beams (the light beam 1 and the light beam N) are depicted. The light beam 1 is represented by solid lines, and the light beam N is represented by broken lines.

The light beams 1 to N are guided by the lens 12. Here, the light beams 1 to N are guided to the lens 12 at different positions. Note that the light beams 1 to N are guided to the lens 12 by free-space propagation in this example.

The lens 12 guides light beams 1 to N to the etalon filter 13. The lens 12 is a collimate lens, for example. In this case, each of the light beams 1 to N is converted to a parallel light beam by the collimate lens and is guided to the etalon filter 13. Here, the light beams 1 to N emitted from the optical splitter 11 enter the liens 12 at different positions. For this reason, the light beams 1 to N enter the etalon filter 13 at different angles. As such, an optical structure including the light splitter 11 and the lens 12 guides the WDM optical signal to the etalon filter 13 so that the plurality of light beams 1 to N obtained by splitting the WDM optical signal enter the etalon filter 13 at different angles.

The etalon filter 13 is an example of an optical filter having periodic transmission characteristics with respect to frequency (or wavelength). That is, the transmittance of the etalon filter 13 periodically changes with respect to frequency. A frequency interval $\Delta v$ with which a peak of transmittance of the etalon filter 13 appears is represented by the following equation.

$$\Delta v = c/(2n\, I \cos \theta) \quad (1)$$

c: light velocity
n: etalon's refractive index
I: etalon's thickness
θ: light traveling angle in the etalon (with vertical incidence condition, θ equals zero)

As such, the frequency interval $\Delta v$ with which a peak of transmittance appears is determined according to the etalon's refraction index, the etalon's thickness, and light traveling angle. Note that the angle θ uniquely corresponds to an incident angle to the etalon filer 13. Also, the frequency with which a peak of transmittance of the etalon filter 13 is shifted according to the incident angle.

Note that the lens 12 in FIG. 8 and FIG. 15, FIG. 16, FIG. 23, FIG. 24, FIG. 25, FIG. 26, and FIG. 28 described further below may be only partially used. In this case, a portion of the lens 12 optically not used can be removed for size reduction or can be replaced by another member. A similar modification can be made on the lens 14 depicted in FIG. 8, FIG. 15, FIG. 16, FIG. 17, FIG. 18, FIG. 19, FIG. 20, FIG. 21, FIG. 22, and FIG. 28.

Figure 9:
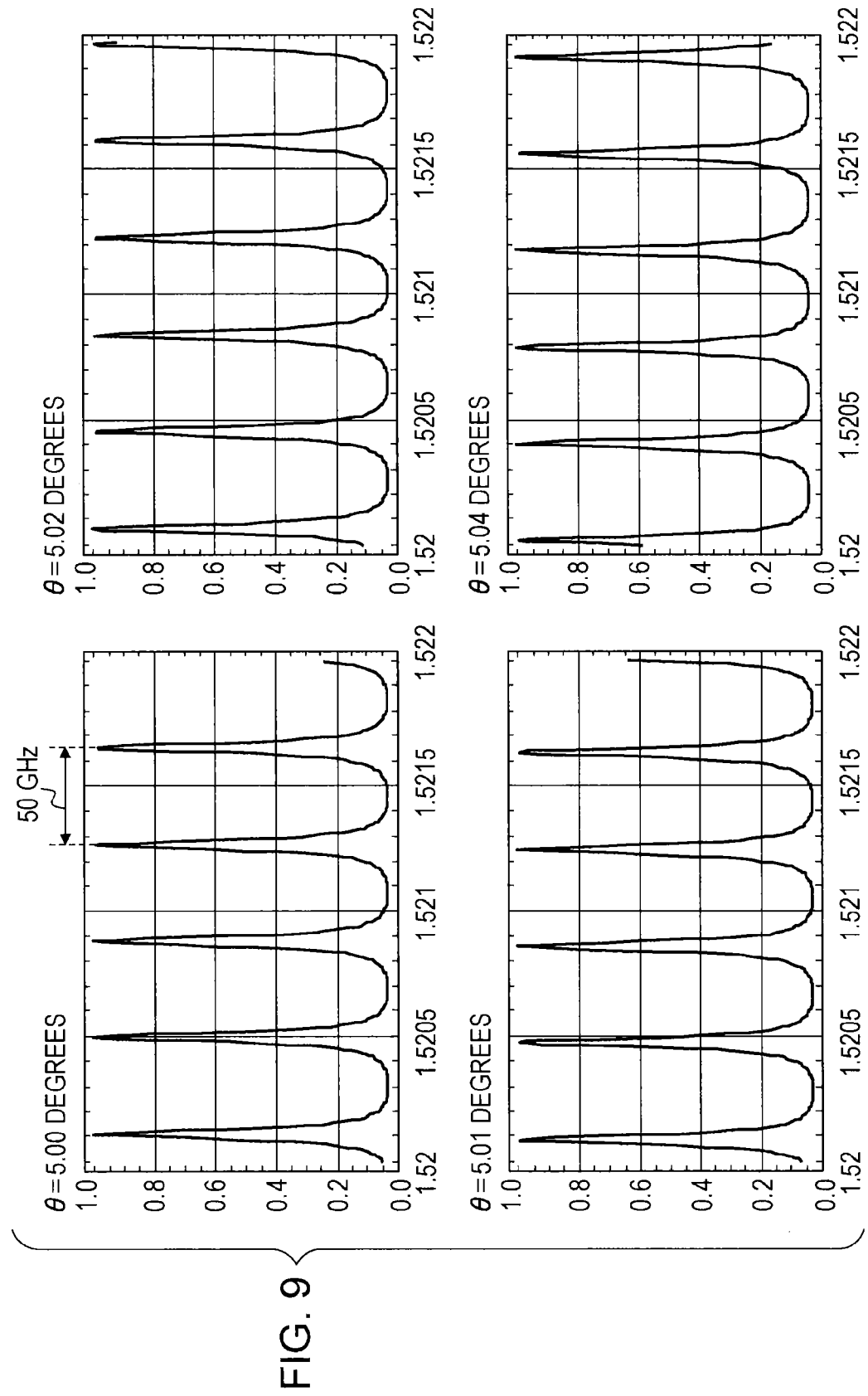
FIG. 9 is a first diagram of a transmission characteristic of an etalon filter.
Figure 10:
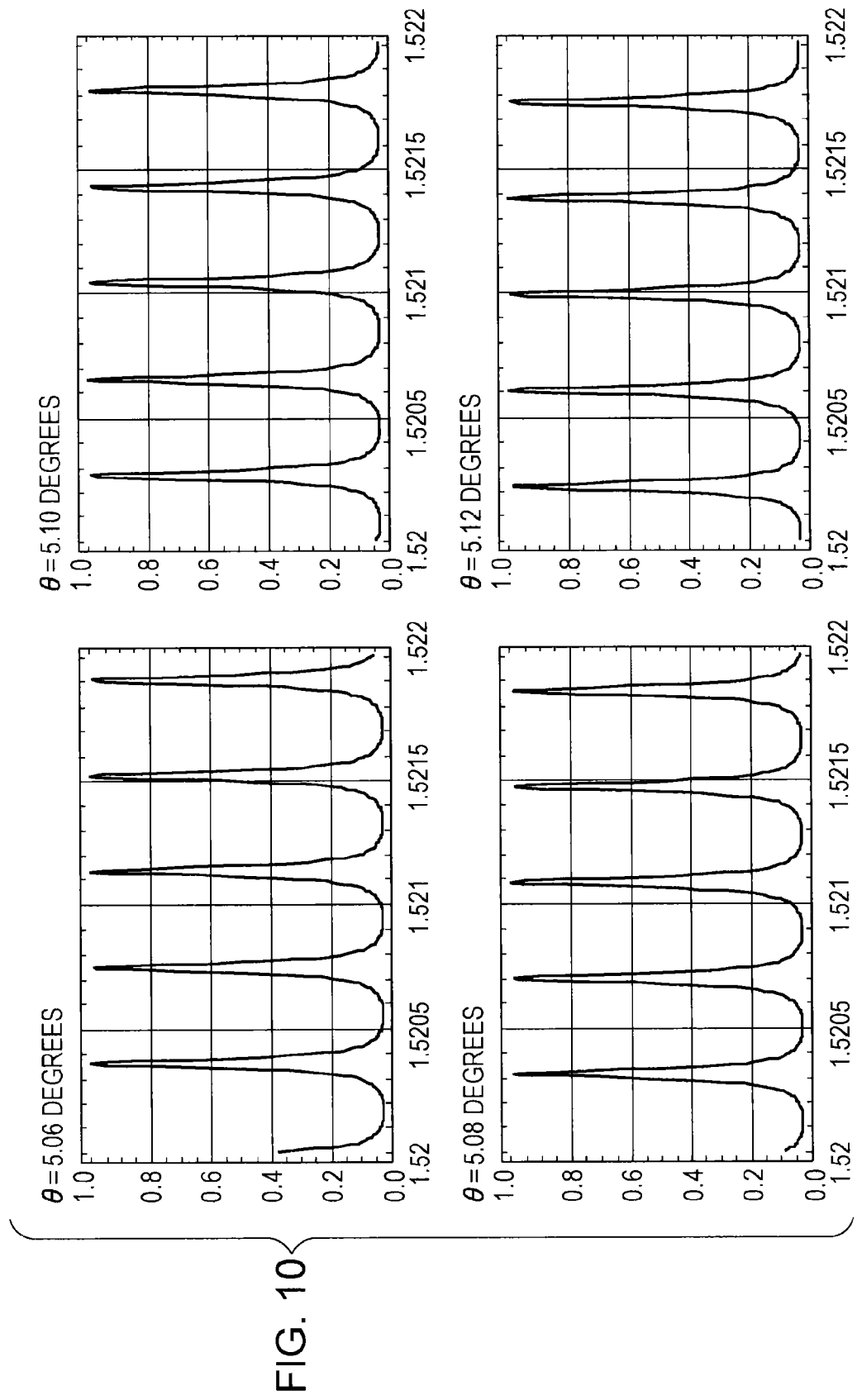
FIG. 10 is a second diagram of the transmission characteristics of the etalon filter.

FIG. 9 and FIG. 10 depict transmission characteristics of the etalon filter 13. These transmission characteristics are obtained from a simulation under the conditions described below. Note that the horizontal axis of each of graphs depicted in FIG. 9 and FIG. 10 is represented in wavelength units. Numerical values on this horizontal axis are represented in μm. The vertical axis represents transmittance.

Etalon's refraction index: 1.5
Etalon's thickness: 2.0076 mm

FIG. 9 depicts transmission characteristics with respect to θ=5.00 degrees, θ=5.01 degrees, θ=5.02 degrees, and θ=5.04 degrees. Also, FIG. 10 depicts transmission characteristics with respect to θ=5.06 degrees, θ=5.08 degrees, θ=5.10 degrees, and θ=5.12 degrees.

In this example, as depicted in FIG. 9, an interval of frequency (or wavelength) with which a peak of transmittance appears is approximately 50 GHz. As the angle θ increases, the interval of frequency (or wavelength) with which a peak of transmittance appears is shifted. For example, when the angle θ is changed from 5.00 degrees to 5.08 degrees, the interval of frequency with which a peak of transmittance appears is shifted by approximately 25 GHz.

Note that as represented by Equation (1) described above, the frequency interval $\Delta v$ depends on the angle θ. However, a deviation of the frequency interval $\Delta v$ due to the change of the angle θ is sufficiently small. For example with respect to an angle change such that the interval of frequency with which a transmission peak appears is shifted by 25 GHz (in the example described above, approximately 0.08 degrees), the deviation of the frequency interval $\Delta v$ is equal to or smaller than 1 GHz in a wavelength width of 5000 GHz (100 channels in 50-GHz grid).

As such, the etalon filter 13 has periodic transmission characteristics with respect to wavelength (frequency). Also, the etalon filter 13 provides different transmission characteristic according to the incident angle. For example, the etalon filter 13 provides transmission characteristics depicted in FIG. 9 for an angle θ=5.00 degrees. Also, the etalon filter 13 provides transmission characteristics depicted in FIG. 10 for an angle θ=5.08 degrees.

As described above, the light beams 1 to N enter the etalon filter 13 at different angles. Here, for example, when the light beam 1 enters the etalon filter 13 so that an angle θ=5.00 degrees is established, the light beam 1 is filtered with transmission characteristics depicted in FIG. 9 (θ=5.00 degrees). Similarly, for example, when the light beam N enters the etalon filter 13 so that an angle θ=5.08 degrees is established, the light beam N is filtered with transmission characteristics depicted in FIG. 10 (θ=5.08 degrees).

The light beams 1 to N filtered by the etalon filter 13 are guided via the lens 14 to the optical detector 15. The lens 14 gathers the light beams 1 to N onto a light receiving surface of the optical detector 15. Note that the lens 14 does not have to be provided when the frequency of the signal superposed on the optical signal (here, the supervisory signal) is sufficiently low.

The optical detector 15 is implemented by an O/E device having a large light receiving surface or an O/E device in an array structure. Note that the array structure referred to herein includes space arrangement in an unequally spaced manner. The O/E device is configured as including, for example, a photodiode. The optical detector 15 outputs a photocurrent according to the intensity of input light. That is, the optical detector 15 collectively converts the light beams 1 to N filtered by the etalon filter 13 to electrical signals. The electrical bandwidth of the optical detector 15 is smaller than a symbol rate-bandwidth of a data signal to be transmitted with each optical signal. Although not being particularly restrictive, the electrical bandwidth of the optical detector 15 is designed to be, for example, 1% or smaller portion of the symbol rate-bandwidth of the data signal to be transmitted with the optical signal. Thus, the data signal is averaged by the optical detector 15. However, the electrical bandwidth of the optical detector 15 is assumed to be at sufficiently wide for the purpose of demodulation of the supervisory signal superposed on the optical signal. That is, although not particularly being restrictive, the electrical bandwidth of the optical detector 15 is designed to be, for example, 0.5 times or higher than a frequency shift keying clock rate of the supervisory signal.

Figure 11:
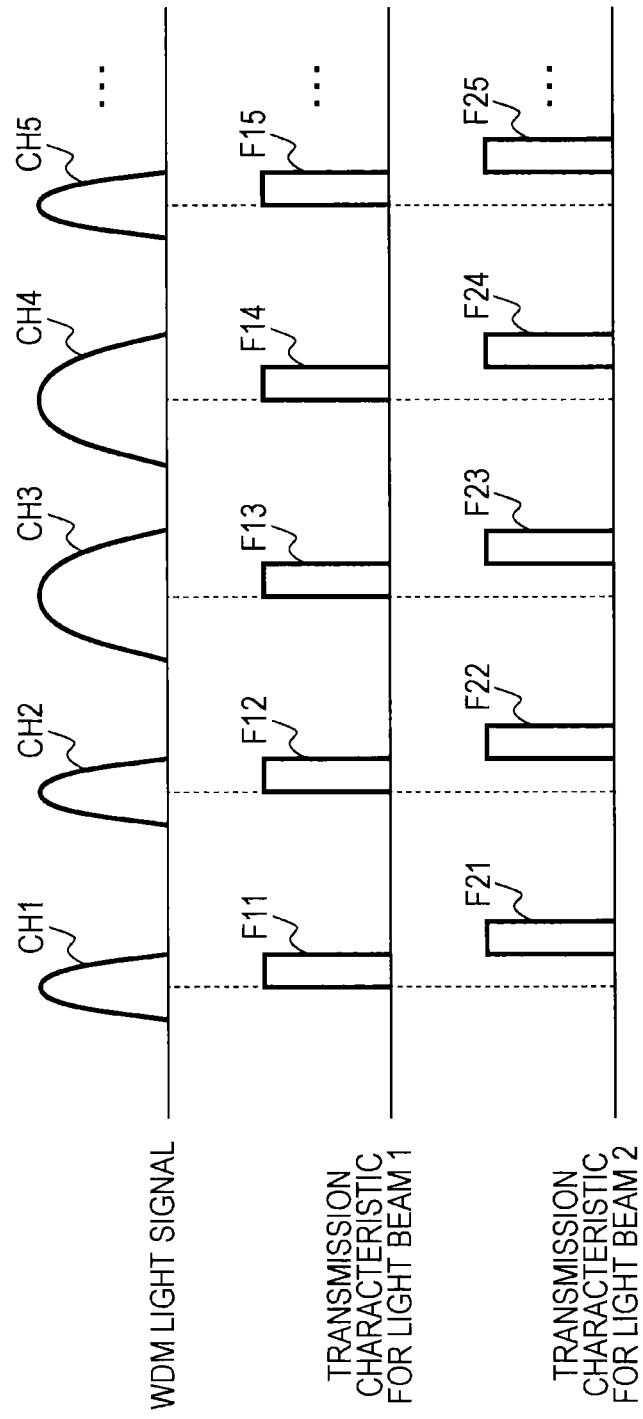
FIG. 11 is a diagram for describing filtering by the etalon filter.

FIG. 11 is a diagram for describing filtering by the etalon filter 13. In this example, the WDM optical signal includes optical signals CH1 to CH5. The optical signals CH1 to CH5 are arranged at predetermined intervals (for example, 50 GHz). The optical signals CH1, CH2, and CH5 each have a bit rate of 10 Gbits/s. The optical signals CH3 and CH4 each have a bit rate of 100 Gbits/s. Furthermore, the optical signals CH1 to CH5 each have a supervisory signal superposed thereon by frequency shift keying.

An optical splitter 11 generates a light beam 1 and a light beam 2 from the input WDM optical signal. The light beam 1 is guided to the etalon filter 13 so as to enter the etalon filter 13 at an angle θ1, The light beam 2 is guided to the etalon filter 13 so as to enter the etalon filter 13 at an angle θ2.

The etalon filter 13 provides passbands F11 to F15 to light entering at the angle θ1, That is, the etalon filter 13 provides the passband F11 to F15 to the light beam 1. The passbands F11 to F15 are provided at intervals approximately similar to those of the optical signals CH1 to CH5. Here, a difference between the center frequency of each of the optical signals CH1 to CH5 and the center frequency of each of the corresponding passbands F11 to F15 (that is, a frequency offset) is set so that the supervisory signal can be detected with high sensitivity from an optical signal of 10 Gbits/s. Therefore, the light beam 1 output from the etalon filter 13 is filtered so that the supervisory signal can be detected with high sensitivity from the optical signals CH1, CH2, and CH5. In other words, the light beam 1 output from the etalon filter 13 includes optical components for detecting the supervisory signal from the optical signals CH1, CH2, and CH5.

Similarly, the etalon filter 13 provides passbands F21 to F25 to light entering at the angle θ2, That is, the etalon filter 13 provides the passband F21 to F25 to the light beam 2. The passbands F21 to F25 are provided at intervals approximately similar to those of the optical signals CH1 to CH5. Here, a difference between the center frequency of each of the optical signals CH1 to CH5 and the center frequency of each of the corresponding passbands F21 to F25 (that is, a frequency offset) is set so that the supervisory signal can be detected with high sensitivity from an optical signal of 100 Gbits/s. Therefore, the light beam 2 output from the etalon filter 13 is filtered so that the supervisory signal can be detected with high sensitivity from the optical signals CH3 and CH4. In other words, the light beam 2 output from the etalon filter 13 includes optical components for detecting the supervisory signal from the optical signals CH3 and CH4.

The optical detector 15 converts output light from the etalon filter 13 to an electrical signal. Here, the output light of the etalon filter 13 includes the filtered light beam 1 and light beam 2. That is, the optical detector 15 outputs electrical signals representing optical components for detecting the supervisory signal from each of the optical signals CH1, CH2, and CH5 and optical components for detecting the supervisory signal from each of the optical signals CH3 and CH4. Note that the rate in the band of the optical detector 15 is sufficiently slower than the symbol rate of the data signal to be transmitted with each optical signal. Thus, the data signal is not detected in the output signal from the optical detector 15.

Figure 12:
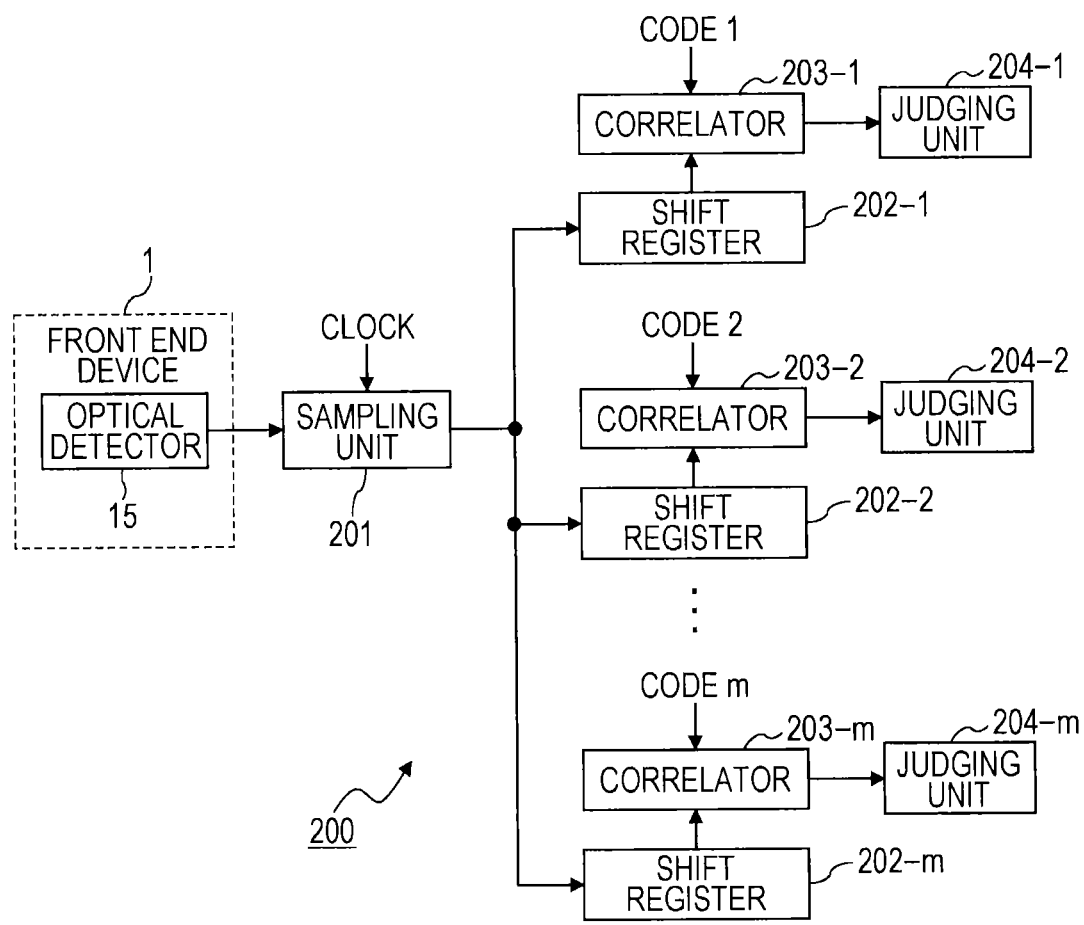
FIG. 12 is a diagram of a first example of a detector detecting a signal superposed on an optical signal.
Figure 13:
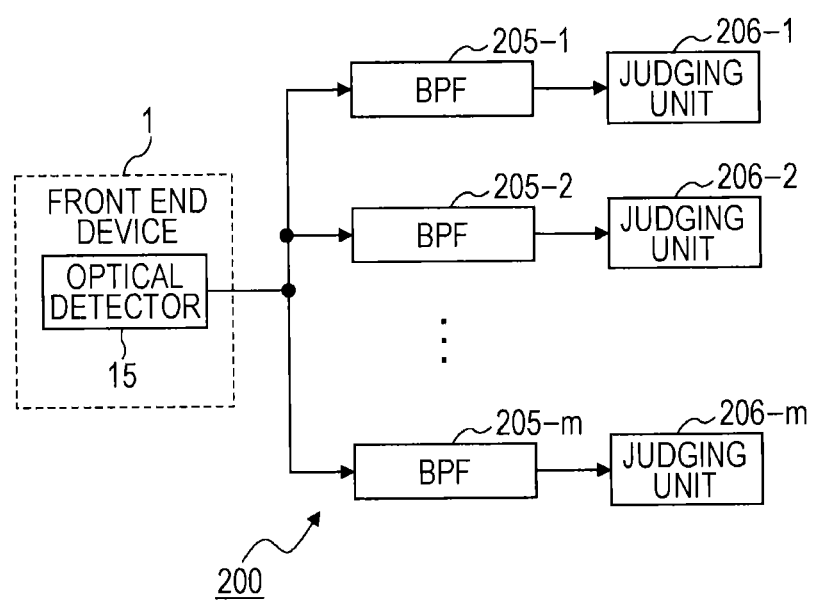
FIG. 13 is a diagram of a second example of the detector detecting a signal superposed on an optical signal.
Figure 14:
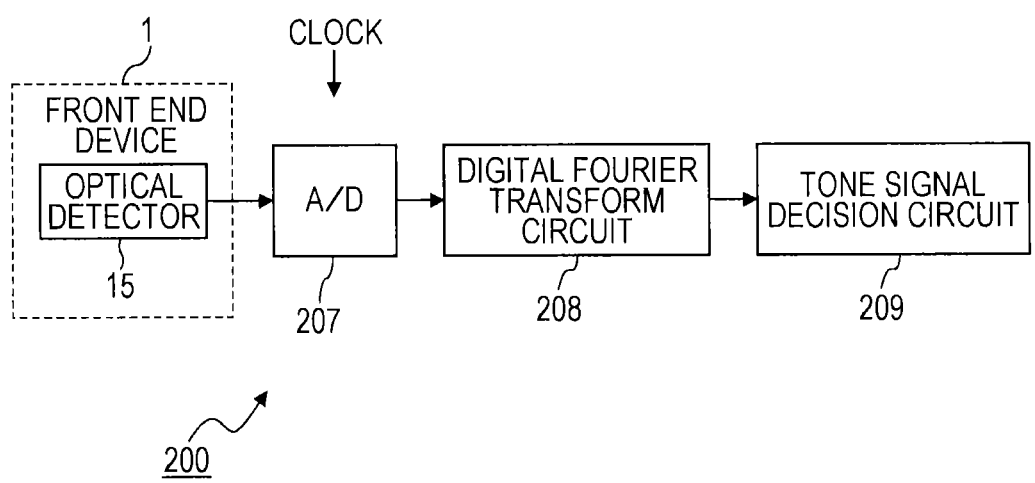
FIG. 14 is a diagram of a third example of the detector detecting a signal superposed on an optical signal.

FIG. 12 to FIG. 14 depict examples of a detector detecting a supervisory signal superposed on each optical signal. A detector 200 depicted in FIG. 12 to FIG. 14 is provided on an output side of the front end device 1, detecting a supervisory signal in the electrical signal generated by the optical detector 15 and obtaining a path ID. Here, the detector 200 can detect supervisory signals each superposed on a plurality of optical signals included in the WDM optical signal. Note that a superposed signal detecting device can be implemented by the front end device 1 and the detector 200.

FIG. 12 depicts an example of the detector 200 when a path ID for identifying an optical path is implemented by a code. It is assumed that a path ID code representing a path ID has a predetermined bit length. In this case, the detector 200 includes a sampling unit 201, shift registers 202-1 to 202-m, correlators 203-1 to 203-m, and judging units 204-1 to 204-m, where m is any integer equal to or larger than 1.

The sampling unit 201 samples an electrical signal output from the optical detector 15. The frequency of a sampling clock is, for example, equal to the bit rate (or the chip rate) of the path ID code. Then, a sample data string obtained from the sampling unit 201 is guided to the shift registers 202-1 to 202-m. The length of each of the shift registers 202-1 to 202-m is equal to the bit length of a path ID code. In many cases, the number of path ID codes used in an optical network is bigger than m. m mainly represents the parallel processing number.

The correlators 203-1 to 203-m are provided with their corresponding codes 1 to m, respectively. The codes 1 to m are provided from, for example, a network management system. Also, the codes 1 to m are codes expected to be superposed on the optical signals in the input WDM optical signal. The correlators 203-1 to 203-m calculate a correlation between the codes 1 to m and sample data strings retained in the sift registers 202-1 to 202-m, respectively.

The judging units 204-1 to 204-m compare correlation values calculated by the correlators 203-1 to 203-m, respectively, and a threshold. Then, based on the comparison results, the judging units 204-1 to 204-m judge whether the codes 1 to m have been detected. For example, if the correlation value calculated by the correlator 203-1 is higher than the threshold, the judging unit 204-1 judges that the code 1 has been detected in the input WDM optical signal. In this case, the detector 200 judges that an optical path identified with the code 1 has been set in the WDM optical signal. On the other hand, if the correlation value calculated by the correlator 203-1 is equal to or smaller than the threshold, the judging unit 204-1 judges that the code 1 has not been detected in the input WDM optical signal. In this case, the detector 200 judges that an optical path identified with the code 1 has not been set in the WDM optical signal.

The correlators 203-1 to 203-m can calculate correlations between the corresponding codes 1 to m and a sample data string independently from and in parallel to each other. Also, the judging units 204-1 to 204-m can compare the correlation values calculated by the correlators 203-1 to 203-m with the threshold independently from and in parallel to each other. Therefore, the detector 200 can collectively and simultaneously judge whether the codes 1 to m can be detected in the input WDM optical signal. That is, the detector 200 can collectively and simultaneously judge whether optical paths identified with the codes 1 to m have been set in the WDM signal.

FIG. 13 depicts an example of the detector 200 when a path ID for identifying an optical path is implemented by a tone signal. Tone signals 1 to m representing path IDs have different frequencies. Here, in the transmitter depicted in FIG. 4, the frequencies of the tone signals 1 to m to be superposed on the optical signals are assumed to be λ(t1) to λ(tm), respectively. In this case, the detector 200 includes bandpass filters 205-1 to 205-m and judging units 206-1 and 206-m.

In the detector 200 depicted in FIG. 13, an electrical signal output from the optical detector 15 is input to the bandpass filters 205-1 to 205-m. The transmission frequencies of the bandpass filters 205-1 to 205-m are λ(t1) to λ(tm), respectively.

The judging units 206-1 to 206-m compare output levels of the bandpass filters 205-1 to 205-m, respectively, with a threshold. Based on these comparison results, the judging units 206-1 to 206-m then judge whether the tone signals 1 to m, respectively, have been detected. For example, if the output level of the bandpass filter 205-1 is higher than the threshold, the judging unit 206-1 judges that the tone signal 1 has been detected in the input WDM signal. In this case, the detector 200 judges that an optical path identified with the tone signal 1 has been set in the WDM signal. By contrast, if the output level of the bandpass filter 205-1 is equal to or smaller than the threshold, the judging unit 206-1 judges that the tone signal 1 has not been detected in the input WDM signal. In this case, the detector 200 judges that an optical path identified with the tone signal 1 has not been set in the WDM signal.

FIG. 14 depicts another example of the detector 200 when the path ID for identifying an optical path is implemented by a tone signal. Tone signals 1 to m representing path IDs have different frequencies. Here, in the transmitter depicted in FIG. 4, the frequencies of the tone signals 1 to m to be superposed on the optical signals are assumed to be λ(t1) to λ(tm). In this case, the detector 200 includes a sampling unit 207, a digital Fourier transform circuit 208, and a tone signal decision circuit 209. The sampling unit 207 is implemented by, for example, an A/D converter. The digital Fourier transform circuit 208 may be a circuit of another one as long as the circuit transforms an input signal to a frequency signal.

In the detector 200 depicted in FIG. 14, an electrical signal output from the optical detector 15 is converted by the sampling unit 207 to a digital signal, and then is transformed in the digital Fourier transform circuit 208 to frequency information. Then, the tone signal decision circuit 209 judges whether any of the tone signals 1 to m is present. For example, if the signal value of the frequency corresponding to λ(ti) is larger than a predetermined threshold, it is judged that a tone signal of λ(ti) is included in the input signal. In this case, the tone signal decision circuit 209 judges that an optical path identified with a tone signal i is set in the WDM optical signal. By contrast, if the signal value of the frequency corresponding to λ(ti) is equal to or smaller than a threshold, the tone signal decision circuit 209 judges that the tone signal i has not been detected from the input WDM optical signal. In this case, the detector 200 judges that no optical path identified with the tone signal i is not set in the WDM optical signal.

Note in FIG. 12 to FIG. 14 that a DC cut part (including an electric capacitor element, an inductor element, an electric resistor element, and others) for removing direct current components and an electric amplifier may be provided on an output side of the optical detector 15. In this case, the DC cut part and the electric amplifier are provided, for example, inside the front end device 1.

Here, it is assumed in the example depicted in FIG. 11 to FIG. 14 (FIG. 12 in the following description) that a supervisory signal including a code 1 is superposed on an optical signal CH1 by frequency shift keying. In this case, components of the supervisory signal including the code 1 are extracted from the light beam 1 entering the etalon filter 13 at the angle θ1 with a passband F11. However, an output signal from the front end device 1 includes not only the components of the supervisory signal extracted from the optical signal CH1 but also components of supervisory signals extracted from the other optical signals (CH2 to CH5). That is, the shift registers 202-1 to 202-m are provided with sample data strings including components of a plurality of supervisory signals.

The correlators 203-1 to 203-m calculate correlations between the sample data strings retained in the shift registers 202-1 to 202-m and the corresponding codes 1 to m, respectively. Here, the correlator 203-1 is provided with the code 1. Also, the sample data string includes components of the supervisory signal corresponding to the code 1. Therefore, the correlation calculated by the correlator 203-1 is a large value. That is, a correlation value larger than the threshold is detected by the judging unit 204-1. As a result, the supervisory signal including the code 1 is detected by the judging unit 204-1.

It is also assumed that a supervisory signal including the code 2 is superposed on the optical signal CH3 by frequency shift keying. In this case, components of the supervisory signal including the code 2 is extracted with a transmission band F23 from the light beam 2 entering the etalon filter 13 at the angle θ2, In this case, a correlation value larger than the threshold is obtained in the judging unit 204-2. That is, the supervisory signal including the code 2 is detected by the judging unit 204-2.

Note that while two different bit rates (10 Gbits/s and 100 Gbits/s) are present in a mixed manner in the example described above, the front end device 1 can receive a WDM optical signal with three or more different bit rates being present in a mixed manner. Also, while the plurality of bit rates are present in a mixed manner in the example described above, the front end device 1 can receive a WDM optical signal with a plurality of modulation schemes being present in a mixed manner.

As such, in the front end device 1, the incident angle to the etalon filter 13 is set so that a transmission band corresponding to either one or both of the bit rate and the modulation scheme of the optical signal in the WDM optical signal is provided. This incident angle can be set by an optical structure including the optical splitter 11 and the lens 12. That is, if the optical structure including the optical splitter 11 and the lens 12 is appropriately determined according to the transmission characteristics of the etalon filter 13, it is possible to provide transmission characteristics for detecting the supervisory signal superposed on the optical signal with high sensitivity with respect to either one or both of any bit rate and any modulation scheme.

Figure 15:
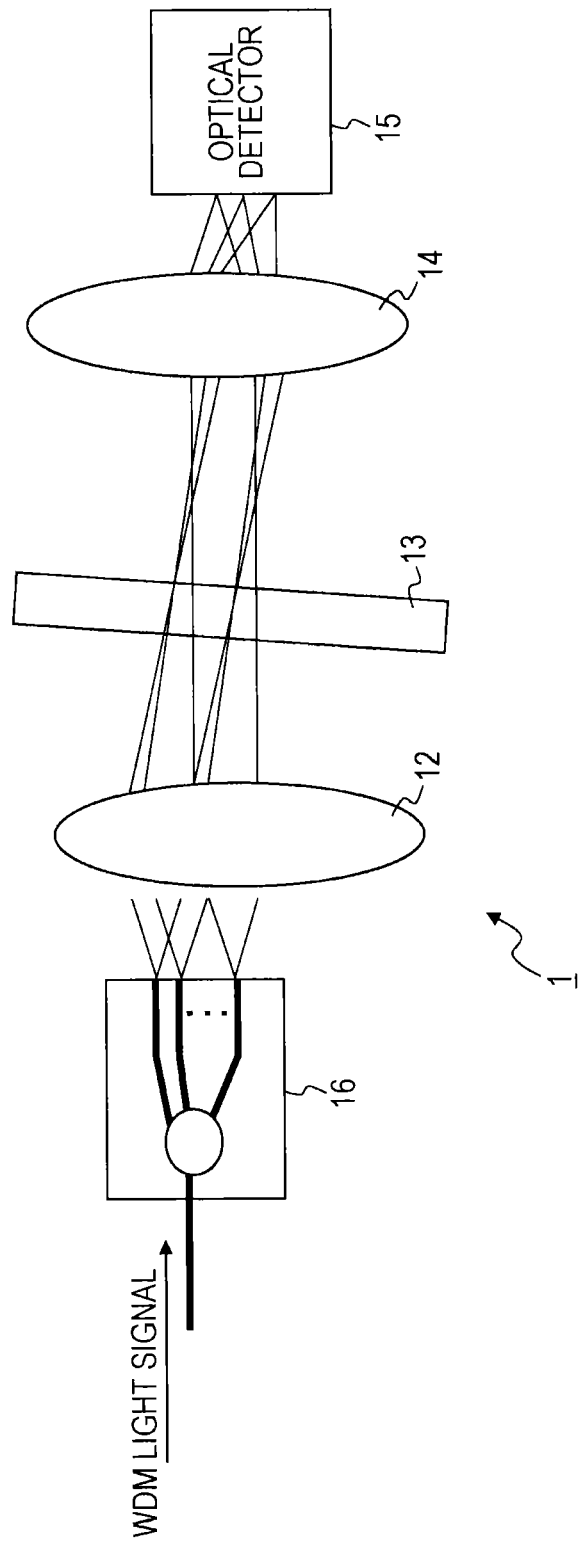
FIG. 15 is a diagram of a modification example of the front end device of the first embodiment.

FIG. 15 depicts a modification example of the front end device of the first embodiment. In the structure depicted in FIG. 8, the input WDM optical signal is split by the optical splitter 11. On the other hand, in the structure depicted in FIG. 15, the input WDM optical signal is split by a splitting optical waveguide 16. Here, it is easy to form a narrow space between the ports of the optical waveguide. Therefore, in the structure depicted in FIG. 15, light beams can be output from adjacent ports, respectively, and therefore the incident angle to the etalon filter 13 can be finely set. Also, the splitting optical waveguide 16 can emit light beams from the optical waveguide directly into space.

Figure 16:
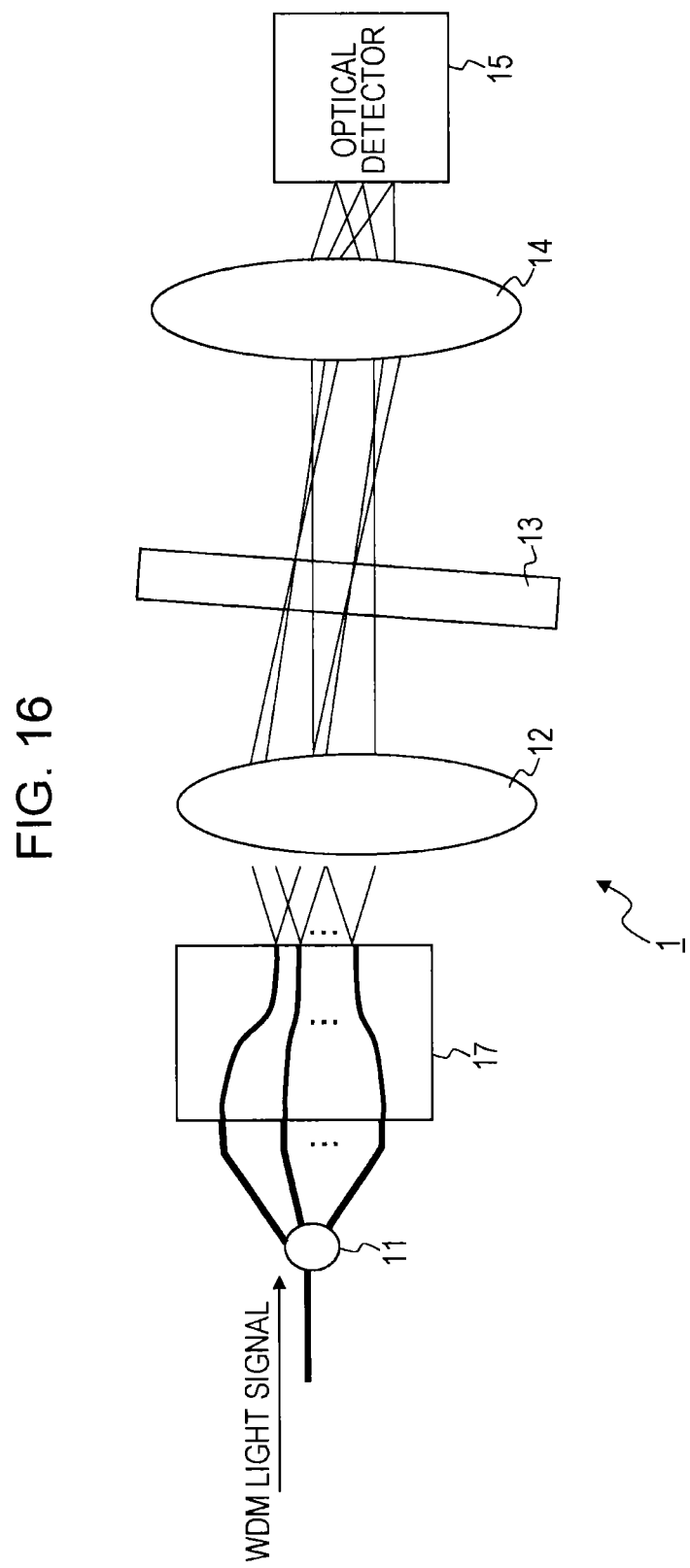
FIG. 16 is a diagram of another modification example of the front end device of the first embodiment.

FIG. 16 depicts another modification example of the front end device of the first embodiment. In a structure depicted in FIG. 16, an optical waveguide for space adjustment 17 is provided between the optical splitter 11 and the lens 12. The optical waveguide for space adjustment 17 adjusts a space between a plurality of light beams emitted from the optical splitter 11. With the structure depicted in FIG. 16, effects similar to those of the structure depicted in FIG. 15 can be obtained.

Figure 17:
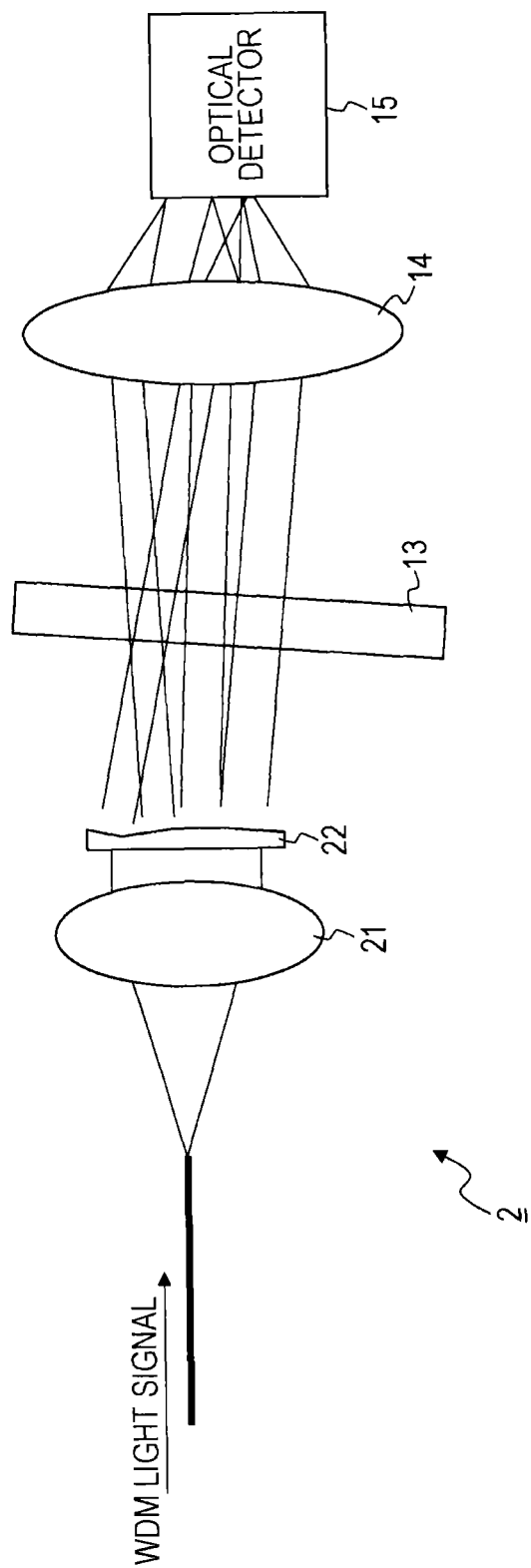
FIG. 17 is a diagram of a front end device of a second embodiment.

FIG. 17 depicts the structure of a front end device of a second embodiment. The front end device 2 of the second embodiment includes a lens 21, a wavefront dividing element 22, an etalon filter 13, a lens 14, and an optical detector 15. Note that the etalon filter 13, the lens 14, and the optical detector 15 are substantially identical to those of the first embodiment and therefore are not described herein.

The lens 21 converts an input WDM optical signal to a parallel light beam. From the parallel light beam obtained by the lens 21, the wavefront dividing element 22 generates a plurality of light beams with different traveling directions. In this embodiment, the wavefront dividing element 22 is made of a material with a high transmittance. On an incident side of the wavefront dividing element 22, one plane is formed. By contrast, on an output side of the wavefront dividing element 22, a plurality of planes with different normal directions are formed. Therefore, when the parallel light beam obtained by the lens 21 enters the wavefront dividing element 22, a plurality of light beams with different traveling directions are generated. The plurality of these light beams enter the etalon filter 13 at different incident angles.

Figure 18:
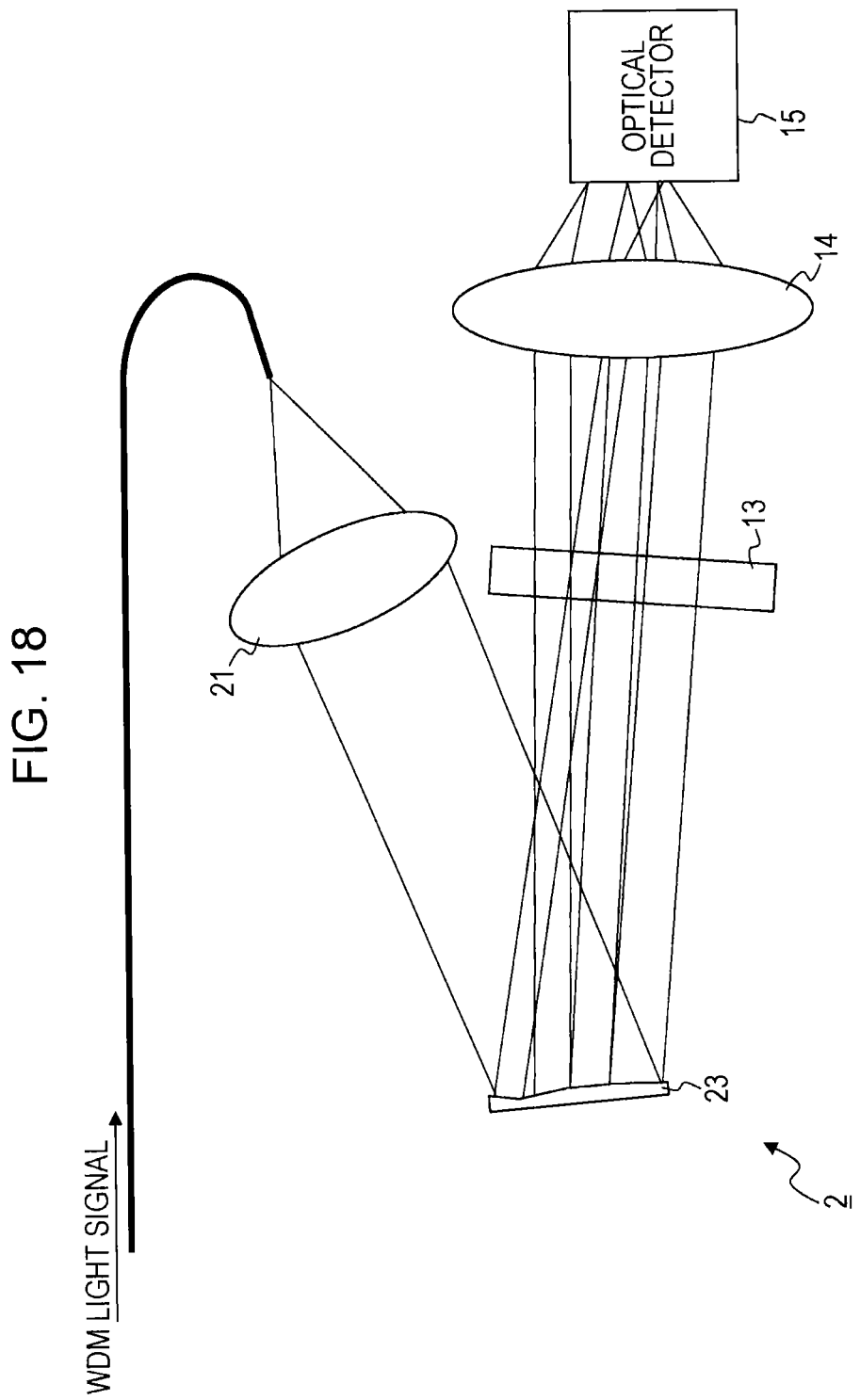
FIG. 18 is a diagram of a modification example of the front end device of the second embodiment.

FIG. 18 depicts a modification example of the front end device of the second embodiment. In a structure depicted in FIG. 18, a reflective wavefront dividing element is used to perform operations similar to those of the structure depicted in FIG. 17. That is, a wavefront dividing element 23 depicted in FIG. 18 has a plurality of reflection planes with different normal directions. Here, the parallel light beam obtained by the lens 21 is guided to the plurality of reflection planes of the wavefront dividing element 23. Therefore, a plurality of light beams with different traveling directions are generated by the wavefront dividing element 23. The plurality of these light beams enter the etalon filter 13 at different incident angles.

As such, in the second embodiment, with the optical structure including the wavefront dividing element 22 or the wavefront dividing element 23, the WDM optical signal enters the etalon filter 13 at different angles. Thus, operations similar to those in the first embodiment can be performed also in the second embodiment.

Figure 19:
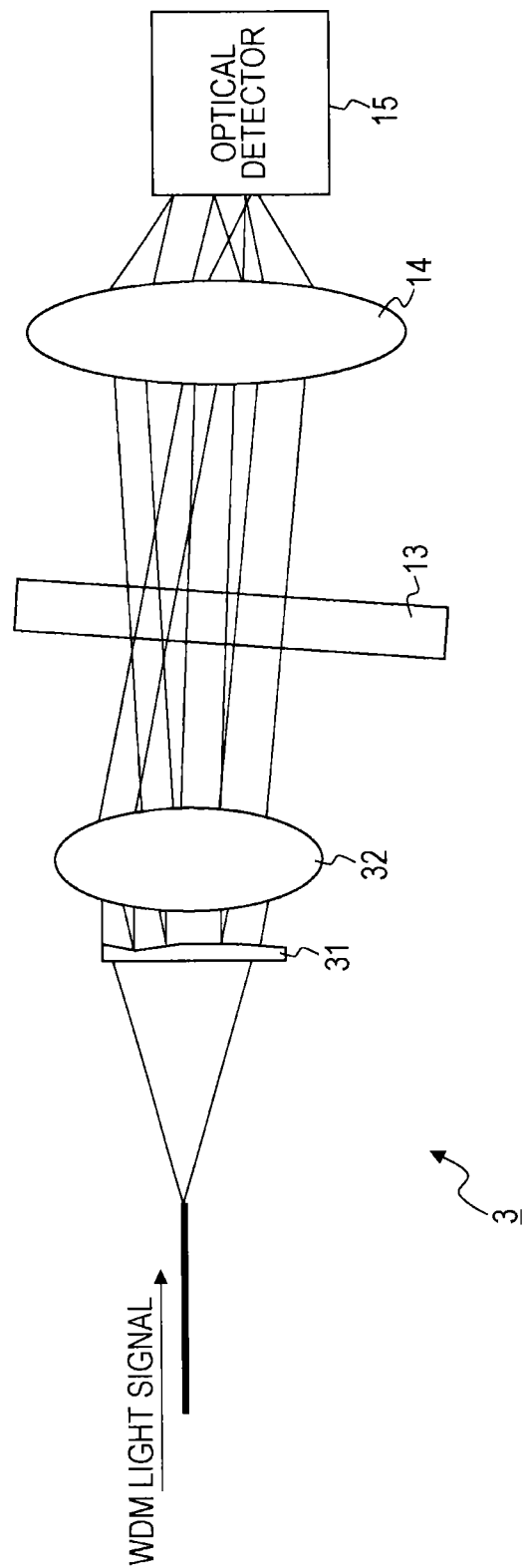
FIG. 19 is a diagram of a front end device of a third embodiment.

FIG. 19 depicts the structure of a front end device of a third embodiment. A front end device 3 of the third embodiment includes a wavefront dividing element 31, a lens 32, an etalon filter 13, a lens 14, and an optical detector 15. Note that the etalon filter 13, the lens 14, and the optical detector 15 are substantially identical to those in the first embodiment and therefore are not described herein.

As with the wavefront dividing element 22 depicted in FIG. 17, the wavefront dividing element 31 generates a plurality of light beams with different traveling directions. However, the wavefront dividing element 31 is provided on an input side of the lens 32, and the plurality of light beams with different traveling directions are generated from the input WDM optical signal. Then, the lens 32 converts each of the plurality of light beams generated by the wavefront dividing element 31 to a parallel light beam. These plurality of light beams enter etalon filter 13 at different incident angles.

Figure 20:
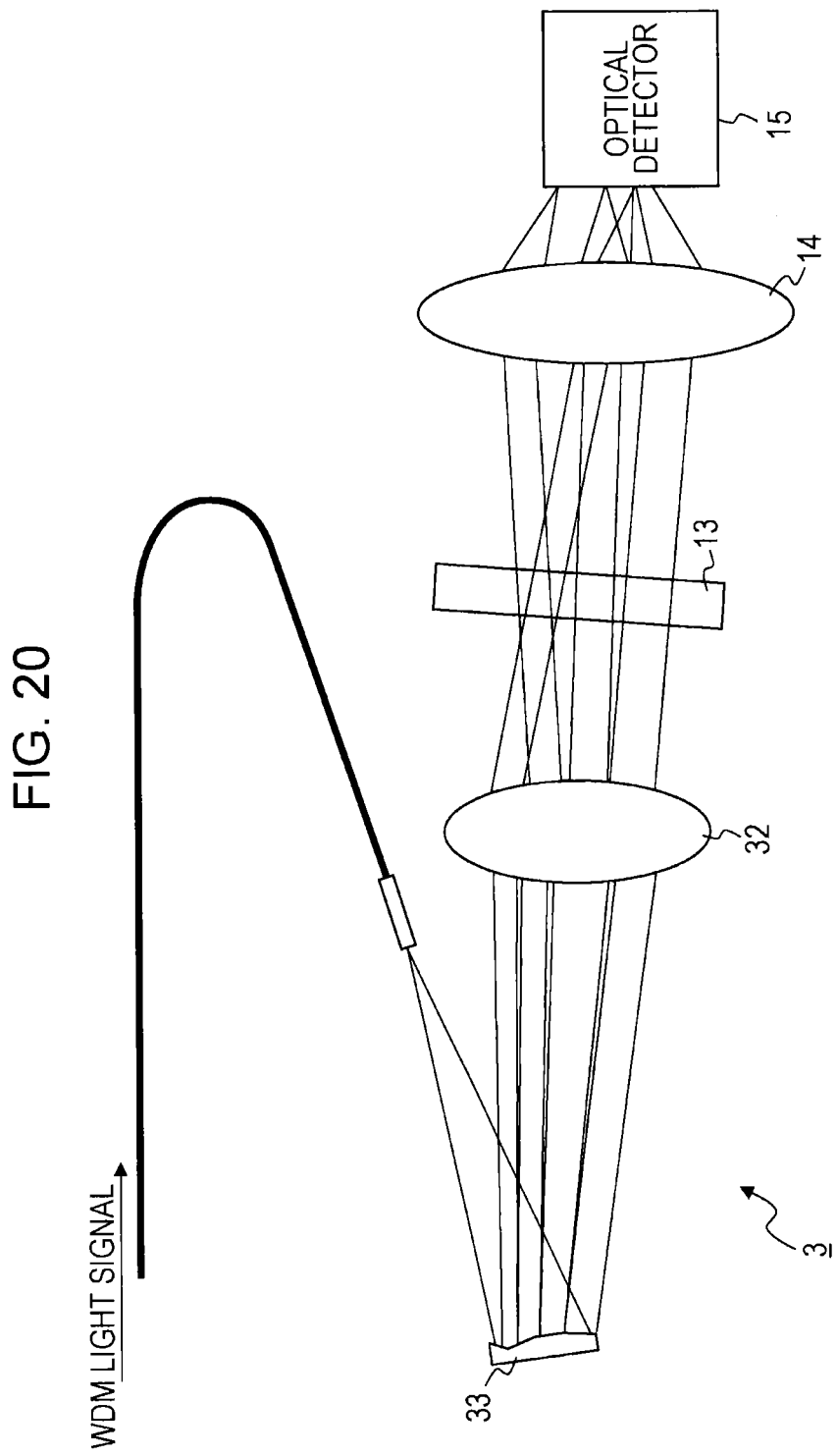
FIG. 20 is a diagram of a modification example of the front end device of the third embodiment.

FIG. 20 depicts a modification example of the front end device of the third embodiment. In a structure depicted in FIG. 20, operations similar to those of the structure depicted in FIG. 19 are performed by using a reflective wavefront dividing element. That is, with a wavefront dividing element 33, a plurality of light beams with different traveling directions are generated from an input WDM optical signal. The plurality of these light beams enter the etalon filter 13 via the lens 32 at different incident angles. Note that although not particularly being restrictive, an end of the optical fiber for transmission of the WDM optical signal has a core enlarged in a taper shape so as to decrease an angle of beam spreading of output light.

As such, in the third embodiment, with the optical structure including the wavefront dividing element 31 or the wavefront dividing element 33, the WDM optical signal enters the etalon filter 13 at different angles. Thus, operations similar to those in the first embodiment can be performed also in the third embodiment.

Figure 21:
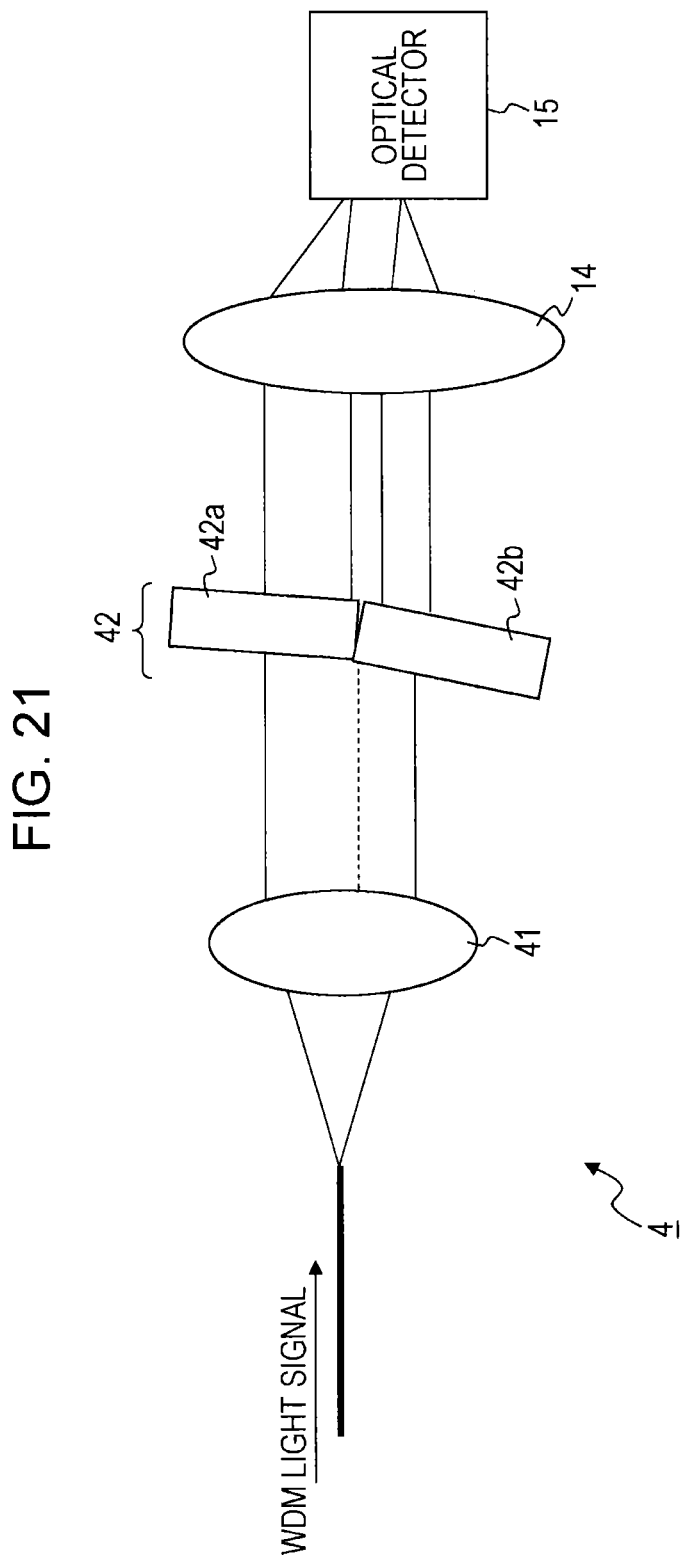
FIG. 21 is a diagram of a front end device of a fourth embodiment.

FIG. 21 depicts the structure of a front end device of a fourth embodiment. A front end device 4 of the fourth embodiment includes a lens 41, an optical filter 42, a lens 14, and an optical detector 15. Note that the lens 14 and the optical detector 15 are substantially identical to those in the first embodiment and therefore are not described herein.

The lens 41 converts an input WDM optical signal to a parallel light beam. The optical filter 42 includes a plurality of etalon filter elements. In the example depicted in FIG. 21, the optical filter 42 includes two etalon filter elements 42a and 42b, Note that the optical filter 42 may include three or more etalon filter elements. The structure (the material and thickness) of each etalon filter element is not particularly restrictive, but may be the same.

A parallel light beam output from the lens 41 is guided by each of the etalon filter elements 42a and 42b of the optical filter 42. Here, the etalon filter elements 42a and 42b are arranged at different angles with respect to a traveling direction of the parallel light beam output from the lens 41. That is, this parallel light beam enters the etalon filter elements 42a and 42b at different angles. Therefore, the etalon filter elements 42a and 42b provide different transmission characteristics to the input light beam.

Figure 22:
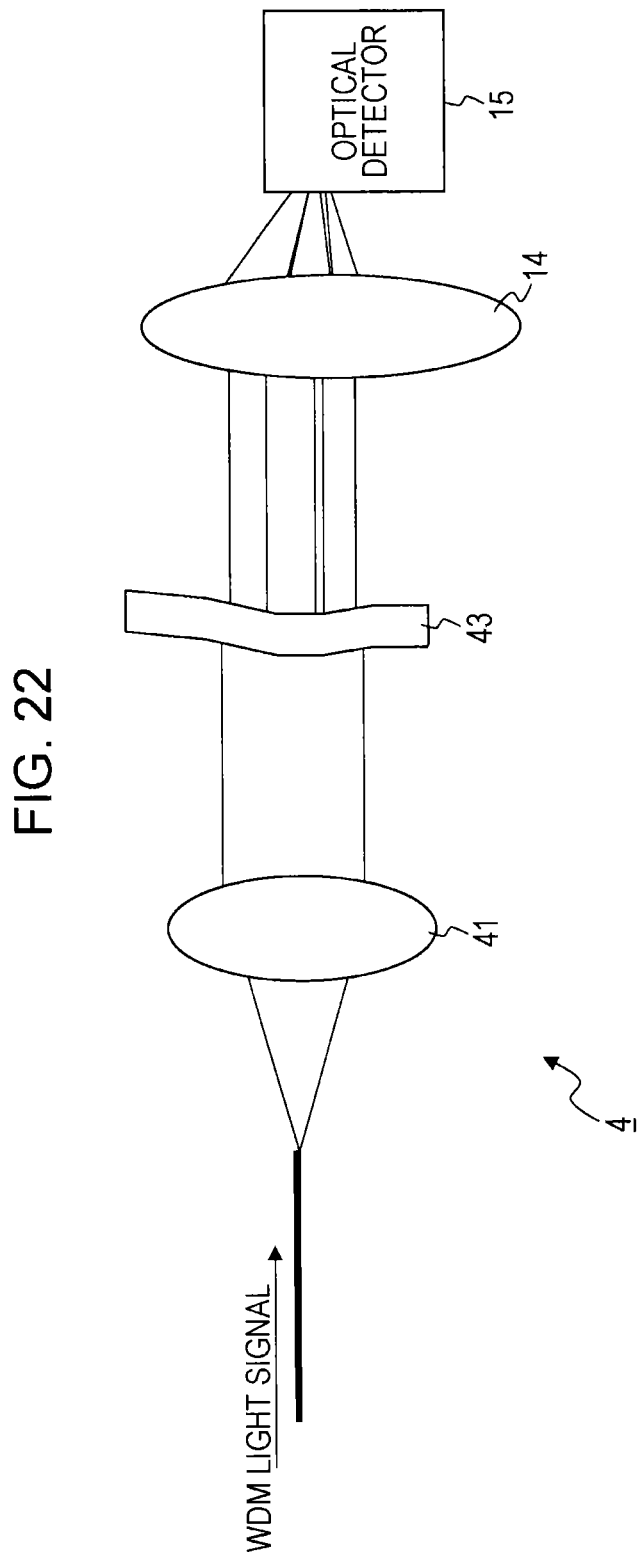
FIG. 22 is a diagram of a modification example of the front end device of the fourth embodiment.

FIG. 22 depicts a modification example of the front end device of the fourth embodiment. In a structure depicted in FIG. 22, in place of the plurality of etalon filter elements depicted in FIG. 21, one etalon filter 43 is used. The etalon filter 43 is formed in a shape so that the parallel light beam output from the lens 41 enters at a plurality of different angles. Note that while the etalon filter 43 has a shape with a plurality of planes with different normal directions in the example depicted in FIG. 22, the fourth embodiment is not restricted to this structure. For example, the etalon filter 43 has a curved incident plane and a curved output plane of the light beam.

As such, in the fourth embodiment, the optical filter (the etalon filter elements 42a and 42b or the etalon filter 43) is provided so that the WDM optical signals enter at a plurality of different angles. Thus, operations similar to those in the first embodiment can be performed also in the fourth embodiment.

A front end device of a fifth embodiment has a holding mechanism of holding elements of an optical structure provided on an input side of an optical filter. This holding mechanism includes a member with a positive coefficient of thermal expansion and a member with a negative coefficient of thermal expansion so that the arrangement of the elements of the optical structure is not change with respect to change in temperature. Note that while the optical structure of the front end device depicted in FIG. 15 or FIG. 16 is described below as an example, the holding mechanism of the present embodiment can be applied to another front end device.

Figure 23:
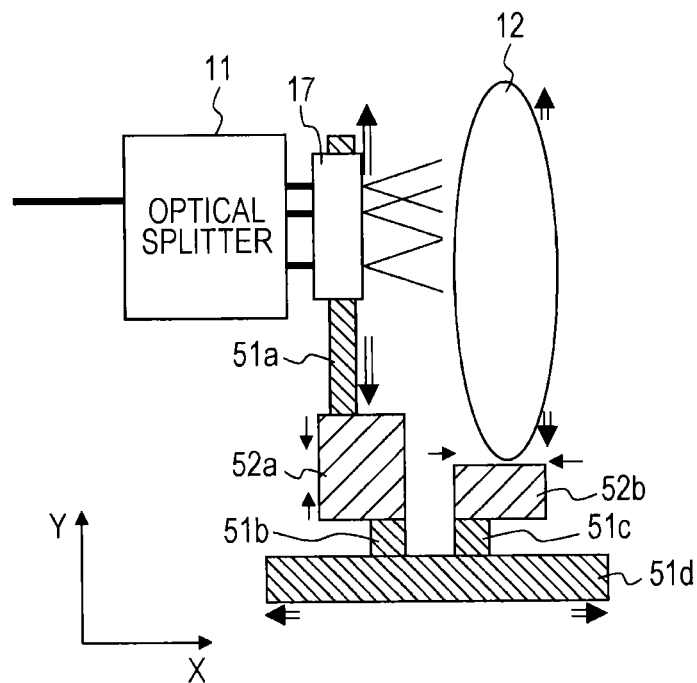
FIG. 23 is a diagram of a first example of a holding mechanism.

In an example depicted in FIG. 23, the holding mechanism includes members 51a to 51d and members 52a and 52b, The optical waveguide for space adjustment 17 is held by the member 51a, The member 51a is fixed to the member 52a, The lens 12 is held by the member 52b, The members 52a and 52b are fixed via the members 51b and 51c to the member 51d, Note that the members 51a to 51d have a positive coefficient of thermal expansion. Also the members 52a and 52b have a negative coefficient of thermal expansion.

In FIG. 23, arrows represents deformation of the members 51a to 51d and the members 52a and 52b at the time of an increase in temperature. For example, when the temperature increases, the members 51a to 51d are each expanded, and the members 52a and 52b are each shrunk.

In the structure described above, when the member 51d is expanded (or shrunk) in an X direction according to the change in temperature, the members 52a and 52b are shrunk (or expanded) in the X direction. Thus, even if the temperature changes, the space between the optical waveguide for space adjustment 17 and the lens 12 is held approximately the same.

When the member 51a is expanded (or shrunk) in a Y direction according to the change in temperature, the member 52a is shrunk (or expanded) in the Y direction. Similarly, when the lens 12 is expanded (or shrunk) in the Y direction, the member 52b is shrunk (or expanded) in the Y direction. Thus, even if the temperature changes, the incident position of each light beam with respect to the lens 12 is substantially unchanged.

Figure 24:
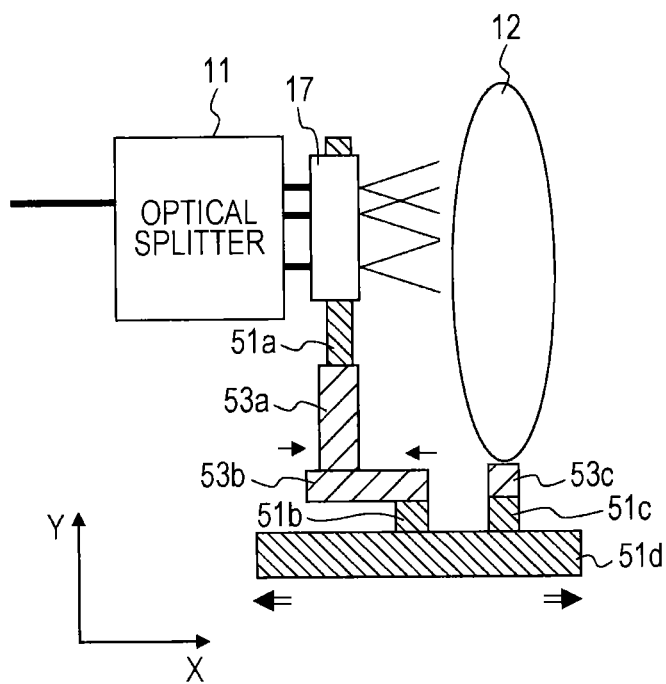
FIG. 24 is a diagram of a second example of the holding mechanism.

In an example depicted in FIG. 24, deformation of the member 51d in the X direction is compensated for by a member 53b, Also, deformation of the member 51a in the Y direction is compensated for by a member 53a, Note that the members 53a and 53b have a negative coefficient of thermal expansion. Furthermore, a member 53c holding the lens 12 may have a negative coefficient of thermal expansion.

Figure 25:
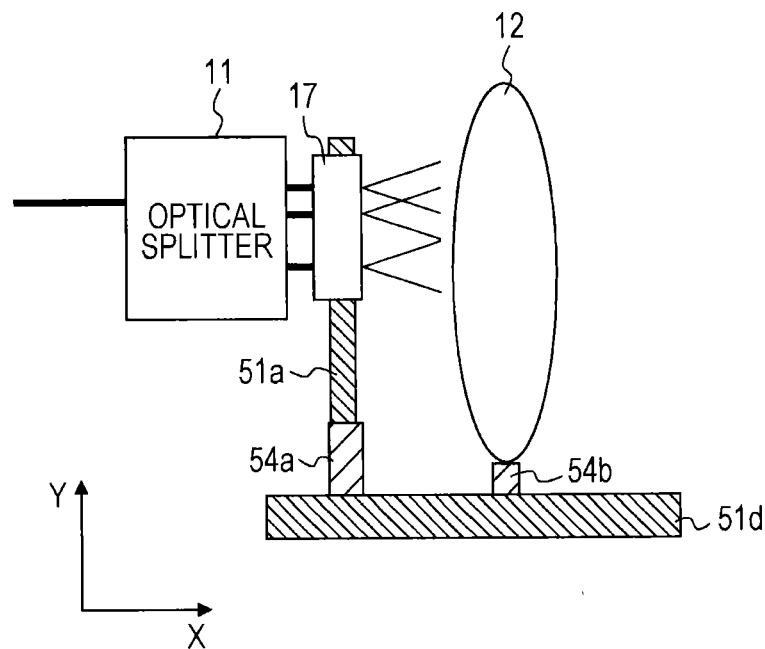
FIG. 25 is a diagram of a third example of the holding mechanism.

In an example depicted in FIG. 25, deformation of the member 51a in the Y direction is compensated for by a member 54a, Here, the member 54a has a negative coefficient of thermal expansion. Also, a member 54b holding the lens 12 may have a negative coefficient of thermal expansion.

While the holding mechanism that holds the elements (the optical waveguide for space adjustment 17 and the lens 12) of the optical structure depicted in FIG. 16 is depicted n FIG. 23 to FIG. 25, the holding mechanism of the present embodiment can be applied to another optical structure. For example, a holding mechanism depicted in FIG. 26 holds the elements of the optical structure depicted in FIG. 15.

Figure 26:
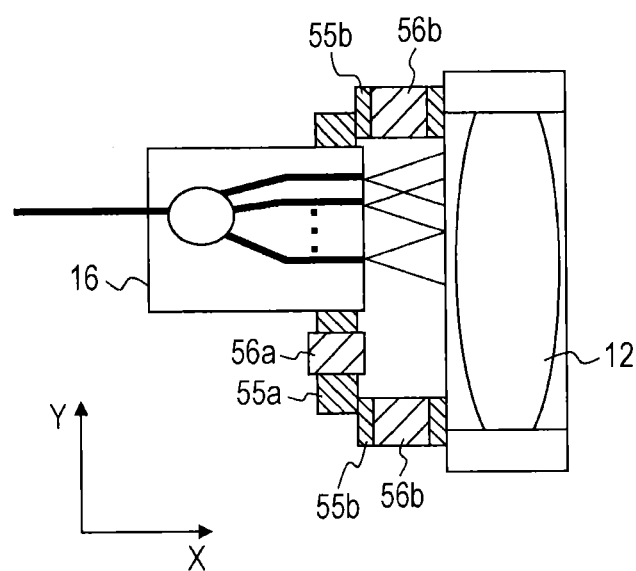
FIG. 26 is a diagram of a fourth example of the holding mechanism.

In FIG. 26, a member 55a having a positive coefficient of thermal expansion and a member 56a having a negative coefficient of thermal expansion are used to hold the splitting optical waveguide 16. Also, a member 55b having a positive coefficient of thermal expansion and a member 56b having a negative coefficient of thermal expansion are used to hold the space between the splitting optical waveguide 16 and the lens 12. Therefore, also in this structure, even if the temperature changes, the incident position of each light beam with respect to the lens 12 is substantially unchanged.

Transmission characteristics of an etalon filter depend on temperature. Therefore, a front end device of a sixth embodiment has a function of stabilizing temperature near the etalon filter.

Figure 27:
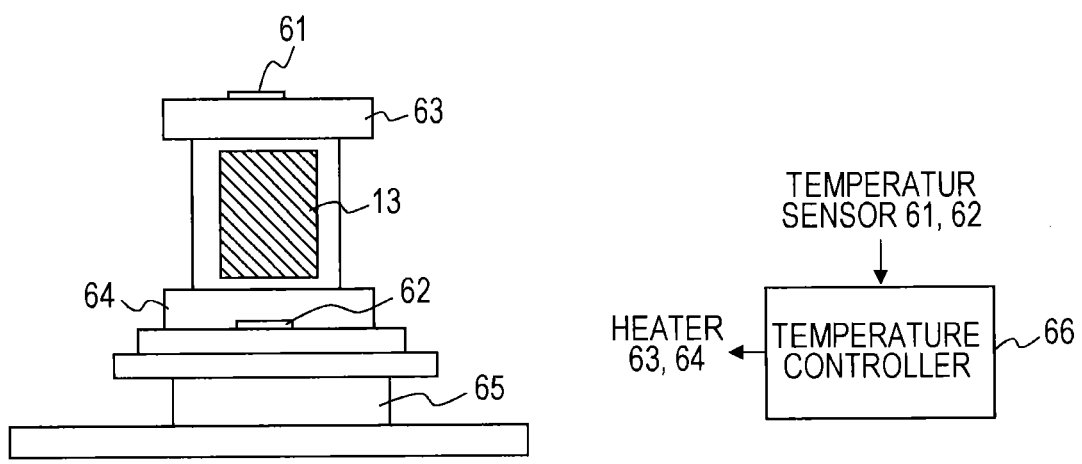
FIG. 27 is a diagram of the structure for controlling temperature near the etalon filter.

FIG. 27 depicts the structure for controlling temperature near the etalon filter. Note that FIG. 27 depicts an etalon filter 13 and its peripheral elements when viewed from an input side of the etalon filter 13.

As depicted in FIG. 27, temperature sensors 61 and 62 and heaters 63 and 64 are provided near the etalon filter 13. A Peltier element 65 is provided on a lower side of the etalon filter 13, the temperature sensors 61 and 62, and the heaters 63 and 64. A temperature controller 66 controls the heaters 63 and 64 and the Peltier element 65 based on temperatures detected by the temperature sensors 61 and 62. Here, the temperature controller 66 controls, for example, the heaters 63 and 64 and the Peltier element 65 so that an average of the temperatures detected by the temperature sensors 61 and 62 is kept at a predetermined temperature designated in advance.

With the structure described above, the transmission characteristics of the etalon filter 13 are stabilized. Therefore, the front end device of the sixth embodiment can appropriately filter each optical signal in the WDM optical signal even the temperature changes.

Figure 28:
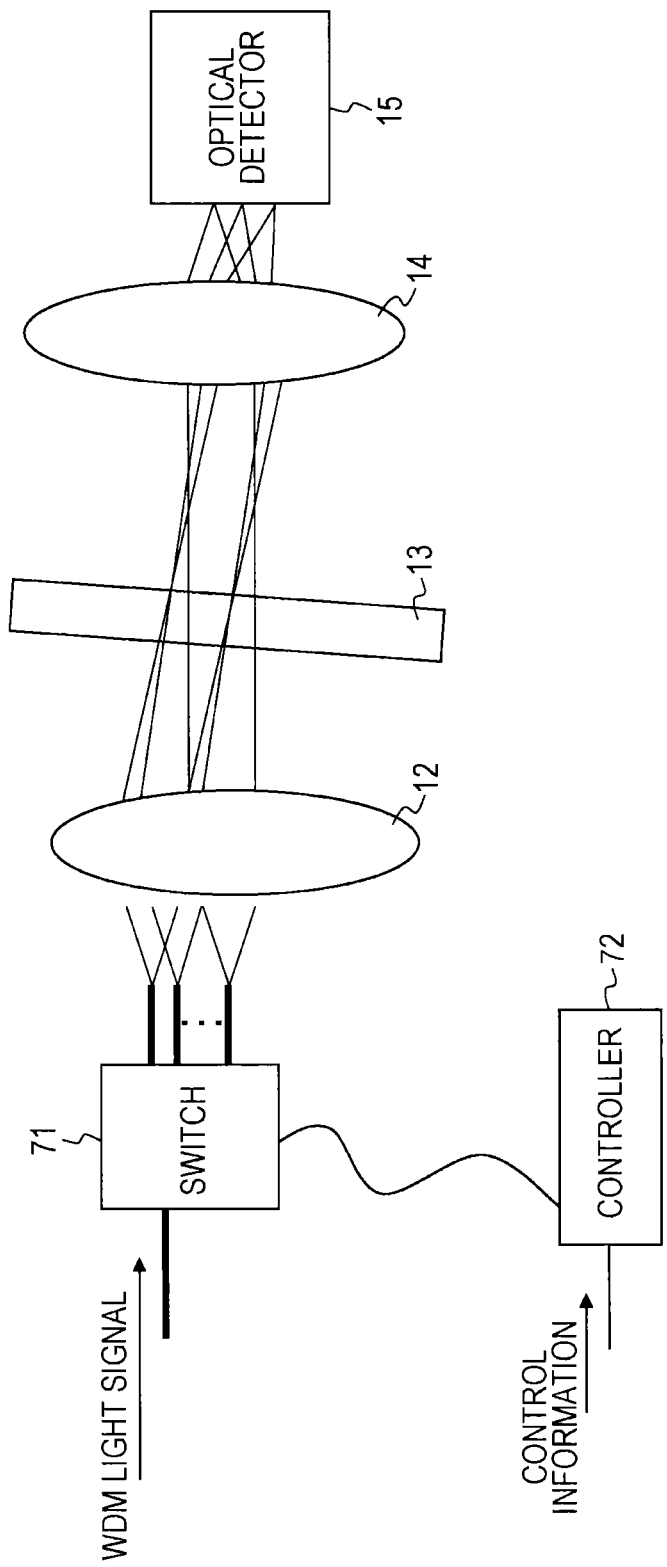
FIG. 28 is a diagram of a front end device of a seventh embodiment.

FIG. 28 depicts the structure of a front end device of a seventh embodiment. A front end device 7 of the seventh embodiment has a structure similar to that of the first embodiment depicted in FIG. 8. However, the front end device 7 of the seventh embodiment includes an optical switch 71 in place of the optical splitter 11 depicted in FIG. 8. Furthermore, the front end device 7 includes a controller 72 that controls the optical switch 71.

The optical switch 71 has a plurality of output ports. The optical switch 71 guides an input WDM optical signal to any one of the output ports. Here, the optical switch 71 outputs the WDM optical signal via the output port designated by the controller 72. The controller 72 sequentially selects one by one from out of the output ports of the optical switch 71.

Light beams output from different ports of the optical switch 71 enter the etalon filter 13 at different angles. Here, the light beams output from the respective ports of the optical switch 71 are designed, for example, to be substantially identical to light beams output from corresponding ports of the optical splitter 11 depicted in FIG. 8. With this, operations similar to those of the first embodiment can be performed also in the seventh embodiment.

However, in the seventh embodiment depicted in FIG. 28, light beams are sequentially output from the optical switch 71. For this reason, in the seventh embodiment, the time for detecting supervisory signals from the plurality of optical signals may be increased. By contrast, in the first to fourth embodiments, a plurality of light beams are simultaneously generated and guided to an optical filter (for example, the etalon filter 13). Therefore, the time for detecting supervisory signals from the plurality of optical signals is short in the first to fourth embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A front end device, comprising:
an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle;
an optical structure configured to guide the WDM optical signal to the optical filter so that the WDM optical signal enters the optical filter at a plurality of different angles; and
an optical detector configured to convert an optical signal output from the optical filter to an electrical signal,
wherein the optical structure includes
an optical splitter configured to branch the WDM optical signal, and
a lens configured to guide a plurality of light beams output from the optical splitter to the optical filter, the plurality of light beams output from the light splitter being guided to the lens at different positions.

2. The front end device according to claim 1, further comprising:
an optical waveguide provided between the light splitter and the lens and configured to guide the plurality of light beams output from the light splitter to the lens.

3. The front end device according to claim 1, wherein the optical structure includes a wavefront dividing element configured to emit or reflect the WDM optical signal to a plurality of traveling directions.

4. The front end device according to claim 1, wherein the optical structure includes
an optical switch configured to have a plurality of output ports and to guide the WDM optical signal to an output port corresponding to a given instruction, and
a lens configured to guide a light beam output from the optical switch to the optical filter, light beams output from the output ports of the optical switch being guided to the lens at different positions.

5. The front end device according to claim 1, wherein the optical filter is an etalon filter.

6. The front end device according to claim 1, further comprising:
a temperature sensor configured to detect a temperature near the optical filter;
a heater provided near the optical filter; and
a temperature controller configured to control the heater according to the temperature detected by the temperature sensor.

7. A front end device, comprising:
an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle;
an optical structure configured to guide the WDM optical signal to the optical filter so that the WDM optical signal enters the optical filter at a plurality of different angles; and
an optical detector configured to convert an optical signal output from the optical filter to an electrical signal, wherein
the optical structure includes
a splitting optical waveguide configured to branch the WDM optical signal, and
a lens configured to guide a plurality of light beams output from the splitting optical waveguide to the optical filter, the plurality of light beams output from the splitting optical waveguide being guided to the lens at different positions.

8. A front end device, comprising:
an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle;
an optical structure configured to guide the WDM optical signal to the optical filter so that the WDM optical signal enters the optical filter at a plurality of different angles; and
an optical detector configured to convert an optical signal output from the optical filter to an electrical signal, wherein
the optical structure includes
a wavefront dividing element configured to emit or reflect the WDM optical signal to a plurality of traveling directions and a lens configured to convert the WDM optical signal to a parallel beam and to guide the parallel beam to the wavefront dividing element.

9. A front end device, comprising:
an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle;
an optical structure configured to guide the WDM optical signal to the optical filter so that the WDM optical signal enters the optical filter at a plurality of different angles; and
an optical detector configured to convert an optical signal output from the optical filter to an electrical signal, wherein
a wavefront dividing element configured to emit or reflect the WDM optical signal to a plurality of traveling directions and a lens provided on an output side of the wavefront dividing element, the lens converting the plurality of light beams output from the wavefront dividing element to a parallel beam and guiding the parallel beam to the optical filter.

10. A front end device, comprising:
an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle, the optical filter including a structure in which the WDM optical signal enters at a plurality of different angles;
an optical structure configured to guide the WDM optical signal to the optical filter; and
an optical detector configured to convert an optical signal output from the optical filter to an electrical signal,
wherein the optical structure includes an optical splitter configured to branch the WDM optical signal, and
a lens configured to guide a plurality of light beams output from the optical splitter to the optical filter, the plurality of light beams output from the light splitter being guided to the lens at different positions.

11. The front end device according to claim 10, wherein the optical filter includes a plurality of filter elements arranged at different angles, and
a light beam output from the optical structure is guided to the plurality of filter elements.

12. The front end device according to claim 10, wherein the optical filter is formed in a shape in which the WDM optical signal enters at a plurality of different angles.

13. A front end device, comprising:
an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle;
an optical structure configured to guide the WDM optical signal to the optical filter so that the WDM optical signal enters the optical filter at a plurality of different angles;
an optical detector configured to convert an optical signal output from the optical filter to an electrical signal; and
a holding mechanism configured to hold elements of the optical structure; wherein
the holding mechanism is formed to include a member with a positive coefficient of thermal expansion and a member with a negative coefficient of thermal expansion so that a positional change in arrangement of the elements of the optical structure is small with respect to a temperature change.

14. A superposing signal detecting device, comprising:
a front end circuit configured to receive a WDM optical signal including a plurality of optical signals each having a superposing signal superposed thereon by frequency shift keying; and
a detector configured to detect a superposing signal superposed on each of the plurality of optical signal in an output signal from the front end circuit, wherein
the front end circuit includes
an optical filter with a transmittance being periodically changed with respect to a wavelength and a wavelength with which a peak of the transmittance appears being shifted according to an incident angle,
an optical structure configured to guide the WDM optical signal to the optical filter so that the WDM optical signal enters the optical filter at a plurality of different angles, and
an optical detector configured to convert an optical signal output from the optical filter to an electrical signal,
wherein the optical structure includes
an optical splitter configured to branch the WDM optical signal, and
a lens configured to guide a plurality of light beams output from the optical splitter to the optical filter, the plurality of light beams output from the light splitter being guided to the lens at different positions.

15. A front end device, comprising:
an optical filter configured to receive a WDM optical signal including a plurality of optical signals each having a superposing signal superposed thereon by frequency shift keying, with a transmittance being periodically changed with respect to a wavelength and a wavelength with which a peak of the transmittance appears being shifted according to an incident angle, the superimposing signal being converted into an optical amplitude signal with high sensitivity by the optical filter having the peak of the transmittance of the wavelength shifted according to the incident angle;
an optical structure configured to guide the WDM optical signal to the optical filter so that the WDM optical signal enters the optical filter at a plurality of different angles; and
an optical detector configured to convert an optical signal output from the optical filter to an electrical signal.

* * * * *

UNITED STATES PATENT AND TRADEMARK OFFICE
CERTIFICATE OF CORRECTION

PATENT NO. : 9,054,814 B2
APPLICATION NO. : 13/756934
DATED : June 9, 2015
INVENTOR(S) : Kazuo Hironishi et al.

Page 1 of 1

It is certified that error appears in the above-identified patent and that said Letters Patent is hereby corrected as shown below:

In the Claims

Column 20, Lines 29-30, In Claim 15, delete "superimposing" and insert -- superposing --, therefor.

Signed and Sealed this
Eighth Day of September, 2015

Michelle K. Lee
*Director of the United States Patent and Trademark Office*